United States Patent [19]
Mahoney et al.

[11] Patent Number: 5,537,491
[45] Date of Patent: Jul. 16, 1996

[54] ANALYZING AN IMAGE OR OTHER DATA TO OBTAIN A STABLE NUMBER OF GROUPS

[75] Inventors: James V. Mahoney, San Francisco, Calif.; Satyajit Rao, Bangalore, Ind.

[73] Assignee: Xerox Corporation, Stamford, Conn.

[21] Appl. No.: 158,053

[22] Filed: Nov. 24, 1993

[51] Int. Cl.$^6$ ............................................. G06K 9/68
[52] U.S. Cl. ............................................. 382/218
[58] Field of Search ........................... 382/1, 27, 34, 382/36, 37, 55, 100, 205, 218, 224, 226, 258

[56] References Cited

U.S. PATENT DOCUMENTS

| | | | |
|---|---|---|---|
| 5,239,596 | 8/1993 | Mahoney | 382/34 |
| 5,261,010 | 11/1993 | Lo et al. | 382/42 |
| 5,263,120 | 11/1993 | Bickel | 395/11 |
| 5,268,773 | 12/1993 | Park et al. | 358/466 |
| 5,268,774 | 12/1993 | Eschbach | 358/466 |
| 5,280,367 | 1/1994 | Zuniga | 358/462 |
| 5,282,061 | 1/1994 | Farrell | 358/464 |
| 5,321,767 | 6/1994 | Murase | 382/8 |

OTHER PUBLICATIONS

Duda, R. O., and Hart, P. E., *Pattern Classification and Scene Analysis*, New York: John Wiley & Sons, 1973, pp. 189–260.

Communication dated Oct. 16, 1995 and European Search Report, Application No. EP 94 30 8655.

Russ, J. C., *The Image Processing Handbook*, CRC Press, Boca Raton, Fla., 1992, pp. 225–294 and 321–338.

Jain, A. K., and Dubes, R. C., *Algorithms for Clustering Data*, Prentice Hall, Englewood Cliffs, N.J., 1988, pp. 1–6, 58–65, 143–148, 160–165, and 223–240.

Ahuja, N., and Schachter, B. J., *Pattern Models*, John Wiley and Sons, New York, 1983, Chapter 1, pp. 1–73.

Hoffman, D. D., *Representing Shapes for Visual Recognition*, Doctoral Thesis, Dep't of Psychology, Massachusetts Institute of Technology, Cambridge, Mass., May 1983, pp. 6–24 and 72–90.

Witkin, A. P., "Scale space filtering: a new approach to multi–scale description," in Ullman, S., and Richards, W., Eds., *Image understanding 1984*, Norwood, N.J., Ablex, 1984, pp. 79–95.

Duda, R. O., and Hart, P. E., *Pattern Classification and Scene Analysis*, Wiley–Interscience, New York, 1983, pp. 211–256.

Haralick, R. M., and Shapiro, L. G., "Image Segmentation Techniques," *Computer Vision, Graphics, and Image Processing*, Vol. 29, 1985, pp. 100–132.

*Primary Examiner*—Jose L. Couso

[57] ABSTRACT

To group items in an array, gap data are obtained indicating gaps between items. The gap data are used to obtain threshold data, which are then used to obtain grouping data. The gaps could, for example, be distances between items in a two-dimensional array or differences between values at which items occur in a one-dimensional array. The threshold data indicate a threshold. The threshold would produce a number of groups of the items that is stable across a range of thresholds, and the range of thresholds meets a criterion for largeness of a range. The criterion can require, for example, that the range be larger than the stable range of thresholds of any other number in a set of numbers of groups. The threshold can be obtained iteratively by applying a candidate threshold for each iteration. The candidate thresholds can be incremented, and the iterations can be counted to find a number of groups meeting the criterion. Or the candidate thresholds can be increased by differences between gaps, and a running sum of threshold ranges can be used to find a number of groups meeting the criterion. The threshold can also be obtained directly by finding the largest difference between gap extents and obtaining a threshold within the largest difference. Many types of grouping can be performed, including spatial clustering, segmentation of partially bounded regions, segmentation by local width, and global and local similarity grouping.

39 Claims, 16 Drawing Sheets

ANALYZING AN IMAGE OR OTHER DATA TO OBTAIN A STABLE NUMBER OF GROUPS

BACKGROUND OF THE INVENTION

The present invention relates to techniques for analyzing data, such as data defining an image, to obtain information about groupings.

Mahoney, U.S. Pat. No. 5,239,596, describes techniques for labeling pixels in an image based on near neighbor attributes. FIG. 7 shows general steps in labeling pixels according to a link relationship criterion and FIG. 8 shows general steps in iterative labeling by applying a near neighbor criterion that is independent of distance. FIGS. 14–19, discussed beginning at col. 13 line 42, show steps in labeling pixels in various ways. A discussion of linked group labeling through grouping operations begins at col. 15 line 63. Grouping operations can apply a wide variety of criteria, including proximity. As discussed at col. 17 lines 15–19, a nearest neighbor criterion selects, at each pixel, the link for which the distance to the neighbor is the minimum. As discussed at col. 17 lines 26–43, a mutuality criterion selects, at each pixel, the link that is mutual with another link, which occurs when pixels are mutual neighbors. As discussed at col. 17 line 45-col. 18 line 11, a proximity grouping criterion defines clusters of elements using local neighbor distances alone, based on the intuition that cluster boundaries are locations of abrupt change in the distance between neighbors—that is, link-lengths vary slowly within a cluster but change abruptly at the boundaries between clusters. As described at col. 18 lines 6–12, sensitivity to scale may be controlled by deselecting a link if it is longer than the product of a constant parameter times the larger of two distances, one of which is the shortest link at the same pixel, the other of which is a global distance parameter. The global distance parameter could, for example, be based on the length of the longest link in the image or the most common link length. Source code for proximity grouping begins in cols. 31 and 32, near mid-page.

SUMMARY OF THE INVENTION

The invention is based on the discovery of problems that arise in analyzing data to obtain information about groupings or equivalence classes. Sometimes the part of an image array or other body of data that is relevant to an analysis task is a collection of items rather than an individual item. In image analysis, this may be true because coherent physical processes tend to produce collections of pixels that are coherent in space or in their geometric properties. Therefore, it is useful to be able to operate on a collection or group rather than on each individual item.

The problems relate to techniques for finding an appropriate number of groups. There is a tension between, on the one hand, automatically determining a number of groups that will produce a satisfactory grouping and, on the other hand, obtaining the number of groups in a simple, principled way.

This tension can be avoided by requiring a user to indicate the number of groups in advance, but the user may not know the appropriate number of groups. This tension can also be avoided by performing grouping for each number of groups in some range—the user can then select the best results or a quality criterion can be applied to the results for each number. But these approaches can be computationally expensive.

Some proposed techniques rely on geometric constraints alone in order to obtain an appropriate grouping. Mahoney, discussed above, uses a constant parameter that is an example of such a constraint. Others have proposed more complex sets of constraints. But grouping techniques tuned in terms of geometric constraints alone may give satisfactory results only for a particular class of inputs. They typically require calibration of constant parameters; and they often involve complicated computation.

The invention is based on the discovery of a new grouping technique that obtains a number of groups automatically in a simple, principled way based on a stability criterion. The technique often obtains intuitively correct and computationally useful groups of items. The groups may be more meaningful than the items they include if they correspond to meaningful structures, such as objects of interest in a scene shown by an image. The grouping technique can be performed as a computational module that is isolated from other computations required by an image analysis task.

The new grouping technique obtains threshold data indicating a threshold that can be applied to data indicating gaps between items in an array. The gaps can, for example, be distances to items in a two-dimensional array that indicate values meeting a reference criterion or differences between items in a one-dimensional array that indicate non-zero values. The threshold produces a number of groups that is stable across a range of thresholds, and the range of thresholds meets a criterion for largeness. The criterion may require, for example, a range of thresholds that is larger than the range across which other numbers of groups are stable.

The criterion of largeness of a range of thresholds can be applied to a set of numbers of groups to find the number in the set that is stable across the largest range. The numbers in the set are all greater than a minimum number. The minimum number should not be less than one, because a grouping with only one group is not of interest and is stable across a range of thresholds that extends into infinity. Further, in some applications of grouping, a minimum number of two can avoid a stable grouping in which one group includes only an outlier while a much larger group includes all other items; if the number of groups must be greater than two, the larger group is divided into two or more smaller groups.

In general, the technique can group sets of value items that meet a transitive closure criterion subject to the threshold. For example, for grouping an array, the transitive closure criterion can require a group of value items to be a connected component within which the value items are all above or all below the threshold. Or the transitive closure criterion can require a group of value items, between each pair of which the value items in the group provide a path and each step of the path is shorter than the threshold; a criterion of this type is necessary for grouping a list or set of foreground items rather than items in an array.

A one-dimensional array can include, for each value of a parameter, a value item indicating whether the value occurs in an image or other body of data. The technique can group a set of value items together whose values occur if each adjacent pair of value items in the set is separated from each other by a difference that is below the threshold. The parameter can be an attribute of features in an image, such as area, elongation, aspect ratio, width, horizontal center of area, vertical center of area, or orientation.

A two-dimensional array can indicate a value for each pixel of an image or for each item in another body of data.

In an array defining an image, for example, the technique can compare the threshold with each pixel's distance to a near neighbor that meets a reference criterion, such as ON or OFF. In clustering, the technique can set a pixel ON if its distance is below the threshold. In segmentation, the technique can set a pixel ON if its distance is above the threshold.

The technique can obtain initial array data defining an initial array of items that indicate values, then use the initial array data to obtain gap data indicating gaps between items in the initial array. The technique can use the gap data to obtain threshold data indicating a threshold such that each gap indicated by the gap data is above or below the threshold. The technique can use the threshold to obtain grouping data grouping the items in the initial array into a number of groups that is stable across a range of thresholds that meets the criterion for largeness.

To group parameter values, the technique can use parameter data indicating a set of parameter values to obtain the initial array data. The parameter's values can define the initial array, and each item in the initial array can indicate whether one of the parameter's values occurs in the set of parameter values indicated by the parameter data. The technique can use the initial array data to obtain a difference or gap between adjacent values of the parameter that occur in the set. The technique can use the gap to obtain threshold data indicating a threshold, and can use the threshold to obtain grouping data. The grouping data indicate groups of items in the initial array.

The technique can use the initial array and the threshold to obtain a group identifier for each item in the initial array with a value in the set of values. If the parameter data indicate a value of the parameter for each position in an array and a position is in a set of positions with values in the set of values, the technique can use the position's value and the group identifiers to obtain a group identifier for the position. The array can, for example, be an image, and the grouping data can define a version of the image that indicates a group identifier for each pixel in the set of positions. The parameter can be an attribute of features in an image, such as area, elongation, aspect ratio, width, horizontal center of area, vertical center of area, or orientation.

To group parts of an image, as in clustering or segmentation, the technique can obtain the gap data from data defining the image. For example, the gap data can indicate, for each pixel, a distance to a black pixel that is a near neighbor of the pixel. The threshold can be compared with each pixel's distance to obtain a thresholded version of the image; each pixel with a distance above the threshold can be ON, or, alternatively, each pixel with a distance below the threshold can be ON. The technique can obtain the grouping data by labeling each pixel in a part of the image with a unique identifier of the group in the thresholded version that includes the part.

The technique can use gap data to obtain threshold data in any of several ways.

A first approach obtains the threshold data iteratively using candidate thresholds that increase for each successive iteration and using gap data that indicate, for each value item in the initial array, a gap. Each iteration obtains thresholded data indicating, for each value item, whether its gap is above or below the iteration's candidate threshold. The thresholded data define group items, each including a set of the value items in the initial array. Each iteration uses the thresholded data to obtain group count data indicating a number of the group items. The first approach uses the group count data to obtain subsequence length data indicating a number of iterations in each subsequence of iterations with group count data indicating equal numbers of group items. Each subsequence's number of iterations represents a range of thresholds, whose size is indicated by the product of the number of iterations with the threshold increment. The first approach finds a subsequence of iterations with a range of thresholds that meets the largeness criterion. For example, the subsequence may have a larger number of iterations than the subsequence of any other number of group items that is greater than a minimum number such as one or two and less than the number of value items in the initial array. The first approach obtains threshold data indicating that the threshold is the candidate threshold of one of the iterations in the subsequence that meets the largeness criterion.

A second approach performs iterations, as in the first approach, but more efficiently because each iteration can skip gaps that do not occur by increasing the threshold by a difference between gaps indicated by the gap data. The second approach uses the group count data to obtain threshold range data indicating a range of thresholds in each subsequence of iterations with group count data indicating equal numbers of group items. The second approach finds a subsequence of iterations with a range of thresholds that meets the largeness criterion, as in the first approach. The second approach obtains threshold data indicating a threshold in the range of thresholds that meets the largeness criterion.

A third approach uses the gap data to obtain largest difference data indicating the largest difference between gaps that are indicated by the gap data and between which the gap data do not indicate any distances. The third approach then uses the largest difference data to obtain threshold data indicating a threshold above the gap that is below the largest difference and below the gap that is above the largest difference.

The third approach can be applied in many ways. For initial array data defining an image, in which each item is a pixel value, clustering and segmentation can be performed as follows:

To cluster, the gap data can indicate distance to a near neighbor for each pixel that meets a foreground neighbor border criterion, meaning that it is at a border between pixels that have different near neighbors. The threshold can be compared at each pixel with the pixel's distance to a near neighbor in the image to obtain a grouped version of the image. Pixels with distances below the threshold are grouped together into connected regions or components in the grouped version of the image.

To segment partially bounded regions, the gap data can indicate distance to a near neighbor for each pixel that meets an opposing foreground neighbor border criterion, meaning that it is at a border between pixels that have near neighbors approximately 180° apart in direction. The threshold can be compared at each pixel with the pixel's distance to a near neighbor in the image. Pixels with distances above the threshold are grouped together into connected components.

To segment by local width, the gap data can indicate distance to a near neighbor for each pixel that meets an opposing background neighbor border criterion, meaning that it is at a border between pixels that have near neighbors in the complement of the image that are approximately 180° apart in direction. The threshold can be compared at each pixel with the pixel's distance to a near neighbor in the complement of the image. Pixels with distances above the threshold are grouped together into connected components.

The technique can be implemented with a machine that includes initial array data and data indicating grouping instructions. The initial array data define an initial array of value items, each indicating a value. The machine's processor can execute the grouping instructions. In executing the grouping instructions, the processor can access the initial array data and use them to obtain gap data indicating one or more gaps between value items in the initial array. The processor can use the gap data to obtain threshold data indicating a threshold such that each gap indicated by the gap data is above or below the threshold. The threshold is chosen so that it would produce a number of groups of the value items that is stable across a range of thresholds that meets a criterion for largeness of a range. The processor can use the threshold data to obtain grouping data indicating a grouping of the value items. The machine can be a high-speed image processing server that responds to image processing requests from a network to which it is connected.

The machine can also include image input circuitry, and the processor can receive input image data defining an input image from the image input circuitry and use them to obtain the initial array data. The machine can be a fax server or a copier.

The technique can also be implemented in a software product that includes a storage medium and data stored by the storage medium. The software product can be used in a machine that includes initial array data defining an initial array of value items, each indicating a value. The data stored by the storage medium can include grouping instructions the machine's processor can execute. In executing the grouping instructions, the processor can access the initial array data and use them to obtain gap data indicating one or more gaps between value items in the initial array. The processor can use the gap data to obtain threshold data indicating a threshold such that each gap indicated by the gap data is above or below the threshold. The threshold is chosen so that it would produce a number of groups of the value items that is stable across a range of thresholds that meets a criterion for largeness of a range. The processor can use the threshold data to obtain grouping data indicating a grouping of the value items.

The technique described above is advantageous because it makes possible efficient grouping of items. In addition, the resulting groupings are often intuitively correct. The technique can be used to automatically group connected components or parameter values in an image. The technique is self-calibrating in the sense that it determines the appropriate number of groups without requiring a user to specify the number in advance. For a wide variety of grouping operations on data defining images, including grouping in one dimension and in two dimensions, the technique can be implemented using the same primitive operations as other image processing operations, allowing efficient grouping without converting from an image representation to another representation of information about the groups. In addition, the technique can be implemented to run on a serial machine in time linearly proportional to the number of image pixels, facilitating its use in image processing.

The following description, the drawings, and the claims further set forth these and other aspects, objects, features, and advantages of the invention.

DETAILED DESCRIPTION

A. Conceptual Framework

Figure 1:
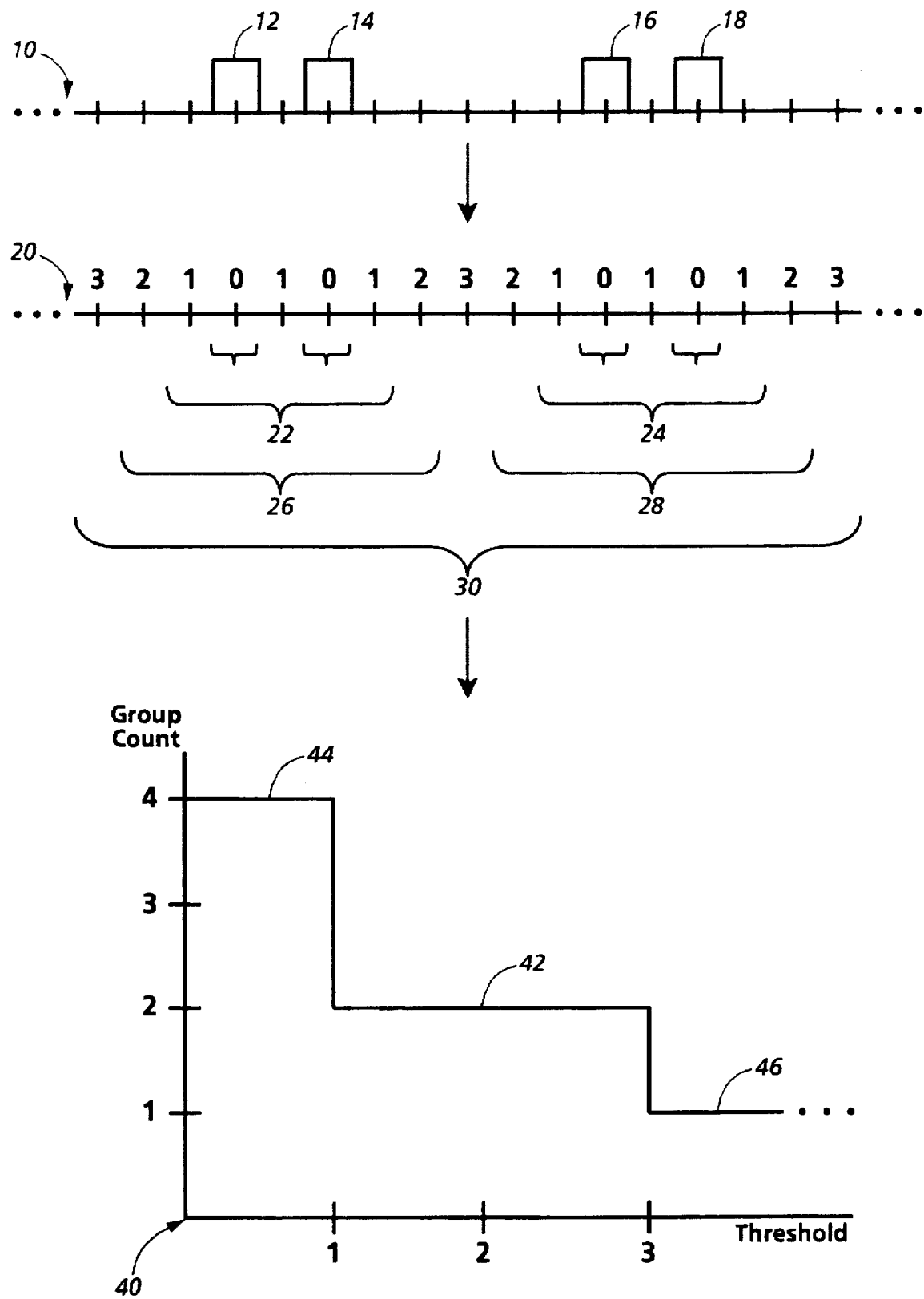
FIG. 1 is a schematic diagram illustrating how a number of groups of items can be stable over a range of thresholds that meets a criterion for largeness.

The following conceptual flamework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar sub-operations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

A "threshold" is a function that can be used to distinguish a number of items into two sets, one set "above" the threshold, and the other set "below" the threshold. A threshold can be a function of position or context within an array of items, or can have the same value for every position and context in the array. The value of a threshold that has the same value for every position and context is typically indicated by indicating either the lowest of the values above the threshold or the highest of the values below the threshold.

A "gap" between items in an array is a portion of the array that extends between the items and does not include any other items that meet an appropriate criterion. For example, in an array of binary items such as a binary image, a gap could extend between two ON items that are separated by OFF items or between two OFF items that are separated by ON items. More generally, in an array of n-ary items, a gap could extend between items above a threshold that are separated by items below the threshold or vice versa. In principle, an array within which gaps occur is equivalent to a variety of data structures—for each item, a value could be indicated; items with each value could be listed; in a binary array, items with one value could be listed, implicitly indicating that all other items have the other value; a hash table or other data structure could indicate each item's value when accessed with the item's position in the array; or a mathematical function of position could provide each item's value. In practice, however, it is advantageous to define an array in a manner that facilitates computation to obtain data indicating information about a gap between items.

An item of data "indicates a gap" between items in an array when the item of data indicates information about the gap, such as position within the array, items between which the gap extends, size, distance from a ridge at the center of the gap to either end of the gap, or another measure of the gap. An item of data "indicates one or more gaps" when the item of data indicates at least one gap between items.

A gap's "value" is a value that indicates the gap's extent, such as a distance over which the gap extends. A "gap difference" is a difference between the values of two gaps indicated by an item of data. No indicated gaps "occur" between two gaps that are indicated by an item of data if none of the gaps indicated by the item of data has a value between the values of the two gaps.

A threshold "would produce" groups of items in an array if the threshold would distinguish items in the array into two sets such that at least one set includes groups of the items. For example, a threshold can be used by obtaining an item of data indicating a distance for a pair of items and then determining whether the indicated distance is above or below the threshold. If below the threshold, then the threshold would produce one group that includes both items; if above, the threshold could produce two groups, one including one item and the other including the other item. In this example, the ability of a threshold to produce groups of items in an array depends on both the threshold and on the arrangement of the items.

A threshold can be used with an item of data indicating a distance or other appropriate value for each item in an array. In this case, a first item's distance may indicate a distance to a second item that meets a "reference criterion," such as a requirement that the second item must indicate a value that is ON or, alternatively, must indicate a value that is OFF.

The number of groups of items that a threshold would produce is "stable across a range of thresholds" if any other threshold within the range of thresholds would produce the same number of groups.

A "criterion for largeness of a range" is a criterion that distinguishes between ranges based on extent. In general, a range whose extent meets the criterion for largeness is larger than another range whose extent does not meet the criterion.

A "grouping" of items in an array is a way in which items can be divided into groups. Two groupings are the same only if every item in every group in each grouping is in the same group in the other grouping. The array may include some items that are not in any of the groups of a grouping.

A "group identifier" identifies a group of items in an array.

An item of data "defines" a number of groups of items in an array if the item of data includes information indicating the number of groups and, for each group, the items it includes. For example, if a first array includes an item for each item in a second array, the first array can define a number of groups of items in the second array in several ways: Each item in the first array can be ON if a distance for its item in the first array is above a threshold or, alternatively below a threshold; in this case, the first array defines groups of adjacent items, which can be counted to obtain the number of groups. Or an item in the first array can include a group identifier identifying a group that includes its item in the second array; in this case, the first array defines groups of items that have the same group identifier and the group identifiers can be counted to obtain the number of groups. If the second array defines an image, the first array can define a version of the image in which the groups cluster connected components or segment the image.

A "comparison criterion" in relation to a threshold is a criterion requiring a result of comparing a value, such as a distance, with the threshold. For example, a comparison criterion could require the value to be above the threshold or below the threshold.

A "transitive closure criterion" subject to a threshold in an array is a criterion requiring a neighboring or near neighbor relationship that links a set of items that meet a comparison criterion for the threshold. A transitive closure criterion for grouping an array can require a group of value items to be a connected component within which the value items are all above or all below the threshold. Alternatively, a transitive closure criterion can require a group of value items, between each pair of which the value items in the group provide a path and each step of the path is shorter than the threshold; a criterion of this type is necessary for grouping a list or set of foreground items rather than items in an array. An item of data indicates "a set of values" of a parameter if the item of data indicates each value in the set. The possible values of a parameter can define an array of items, each of which indicates, for one of the possible values, whether the value is in a set of values indicated by an item of data. Also, an array can indicate a set of values of a parameter by indicating, for each position in the array, a value of the parameter; for example, each pixel in a version of an image can indicate a value of a parameter that is an attribute of features in images such as area, elongation, aspect ratio, width, horizontal center of area, vertical center of area, or orientation.

Two values of a parameter are "adjacent" in an array defined by the possible values of the parameter if the array includes an item for each of the values indicating that the value is in the set of values indicated by an item of data and if every item in the array for a value that is between the two values indicates that the value is not in the set of values.

B. General Features

Figure 2:
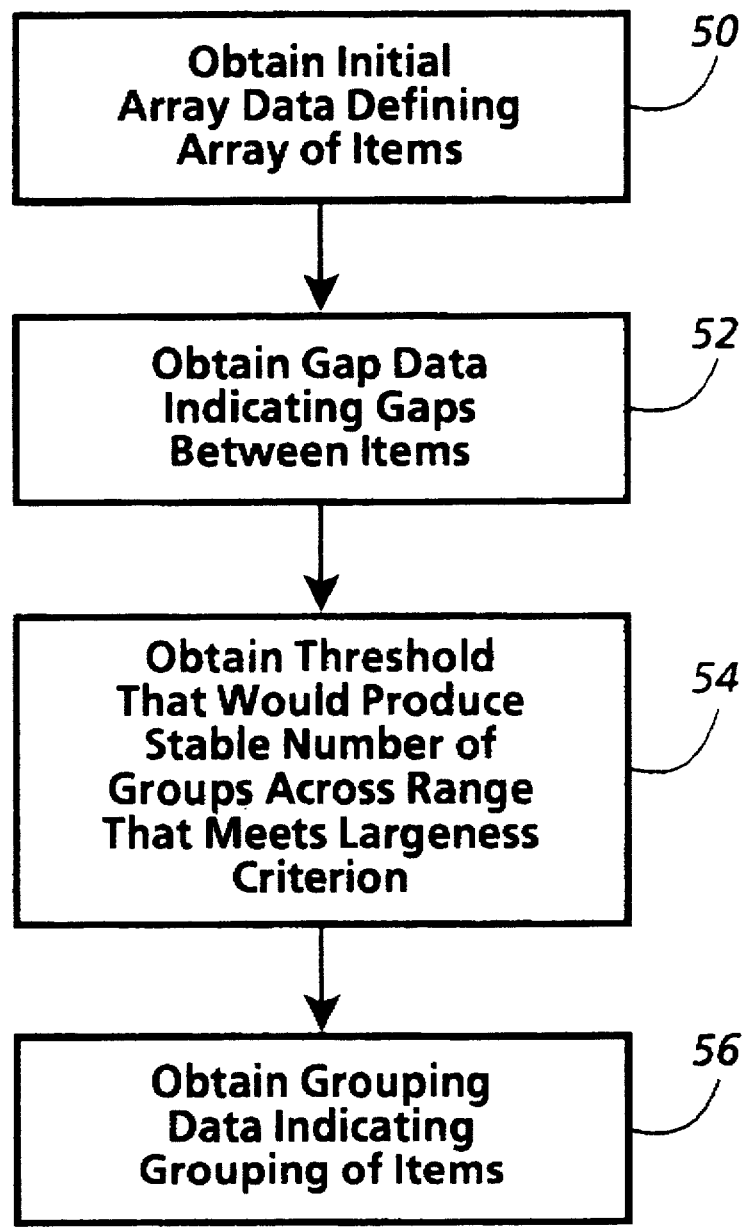
FIG. 2 is a flow diagram showing general acts in obtaining thresholded distances data defining a number of groups of items that is stable over a range of thresholds that meets a criterion for largeness.
Figure 3:
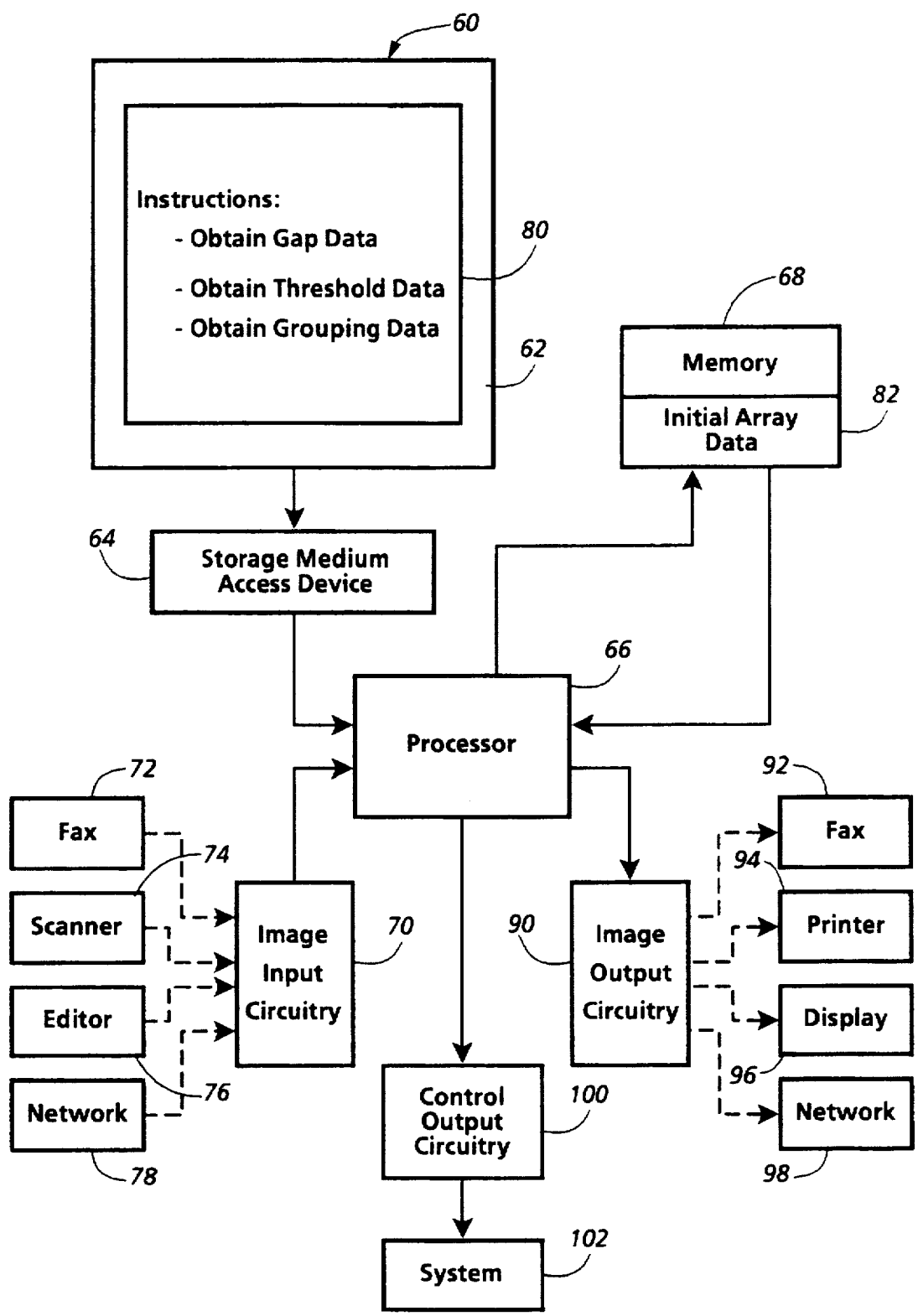
FIG. 3 is a schematic block diagram showing general components of a software product and a machine in which the software product can be used to implement the general acts in FIG. 2.

FIGS. 1–3 show general features of the invention. FIG. 1 shows schematically how data indicating gaps can be used to obtain a threshold that would produce a number of groups of items that is stable across a range of thresholds that meets a criterion for largeness of a range. FIG. 2 shows general acts in obtaining and using a threshold that would produce a number of groups of items that is stable across a range of thresholds that meets a criterion for largeness of a range. FIG. 3 shows general components of a software product and of a machine in which it can be used.

In FIG. 1, initial graph 10, which could be a histogram, shows a one-dimensional array. The illustrated items in the array are binary, with items 12, 14, 16, and 18 having one binary value and the other items having the other binary value. The array could, for example, be defined by the values of a parameter. Items 12, 14, 16, and 18 could indicate that four values of the parameter are indicated by an item of data, while other values of the parameter are not indicated.

Initial graph 10 can be used to produce gap graph 20, a one-dimensional array in which each item indicates a distance between it and the nearest of items 12, 14, 16, and 18. Therefore, the distances for items 12, 14, 16, and 18 are zero, while items in gaps between items 12, 14, 16, and 18 have non-zero distances. At the center of each gap between items 12, 14, 16, and 18 is a distance that indicates the gap by indicating half the extent of the gap. The gaps between items 12 and 14 and between items 16 and 18 are each two units wide, so their center distances are each one; the gap between items 14 and 17 is six units wide, so its center distance is three.

FIG. 1 also shows how groups of items in initial graph 10 could be obtained using gap graph 20. A sequence of thresholds can be used to distinguish distances that are above and below each threshold. Each threshold groups together adjacent items with distances below the threshold, with adjacent groups separated by items with distances above the threshold. As shown, four groups can be obtained by applying a threshold between zero and one, and each group includes one of items 12, 14, 16, and 18; two groups 22 and 24 can be obtained by applying a threshold between one and two; two groups 26 and 28 can be obtained by applying a threshold between two and three; and only one group 30 can be obtained by applying a threshold above three.

Graph 40 summarizes the group results and illustrates how one number of groups can be stable across a range of thresholds that meets a criterion for largeness of a range. Each position on the x axis represents a threshold value, while each position on the y axis represents a count of groups. As shown, the group count starts at four with a threshold below one, then decreases to two when the threshold reaches one. The group item count remains at two as the threshold increases from one to three. Then, when the threshold reaches three, the group item count decreases to its final value, one.

Portion 42 of graph 40 is longer than portion 44, and is the longest stable portion of graph 40 other than portion 46. Portion 46 is not meaningful because every group count over an array that includes at least one item eventually reaches a stable value of one. Therefore, two, the number of groups of the initial items obtained by thresholds within portion 42, could meet a criterion for largeness of a range because it is stable over a larger range of thresholds than four, another number of groups which is stable only over portion 44. If the items are grouped using a threshold within the range indicated by portion 42, items 12 and 14 are in a first group, and items 16 and 18 are in a second group; but if the items are grouped using a threshold within the range indicated by portion 44, there are four groups, each with one of items 12, 14, 16, and 18.

The general acts in FIG. 2 begin in box 50 by obtaining initial array data defining an initial array of items that each indicate a value. The initial array can be a one-dimensional array as illustrated in FIG. 1, or any n-dimensional array, where n is an integer greater than zero. The act in box 52 uses the initial array data to obtain gap data indicating gaps between items in the initial array. The act in box 54 uses the gap data to obtain threshold data indicating a threshold that would produce a number of groups of the items. The number of groups is stable across a range of thresholds, and the range of thresholds meets a criterion for largeness of a range. The act in box 56 uses the threshold data to obtain grouping data indicating a grouping of the items.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating grouping instructions 80, which processor 66 can execute to perform acts like those in FIG. 2. In executing instructions 80, processor 66 uses initial array data to obtain gap data. Initial array data 82 could be previously stored in memory 68 as shown or could be obtained by operating on data defining an input image received from image input circuitry 70. Initial array data 82 define an initial array of items, each indicating a value. The gap data indicate gaps between items in the initial array. Processor 66 uses the gap data to obtain threshold data indicating a threshold that would produce a number of groups of the initial items; the number of groups is stable across a range of thresholds, and the range of thresholds meets a criterion for largeness of a range. Processor 66 uses the threshold data to obtain grouping data indicating a grouping of the items in the initial array.

Processor 66 can also be connected for providing data defining images to image output circuitry 90. For example, software product 60 could include data indicating instructions processor 66 can execute to use the grouping data in obtaining output image data defining an output image. The output image could show a precisely formed representation of information from an input image, for example. The output image data could be provided to image output circuitry 90, and could in turn be provided to fax machine 92, to printer 94, to display 96, or to network 98.

The grouping data could also be used to provide control signals. For example, memory 68 could store control instructions processor 66 can execute to use the grouping data in obtaining control data defining control signals. The control data could be provided to control output circuitry 100, which could respond by providing control signals to system 102.

Rather than being used immediately, the grouping data could instead be stored in memory 68 for possible future use. This would be appropriate, for example, where information indicating an operation to be performed on an input image has not been obtained at the time data defining the input image is received.

C. Implementation

The general features described above could be implemented in numerous ways on various machines to analyze array data such as data defining an image. An implementation described below analyzes data defining images and uses the results to control a graphic rendering system.

1. Obtaining Threshold with Stable Number of Groups

Figure 4:
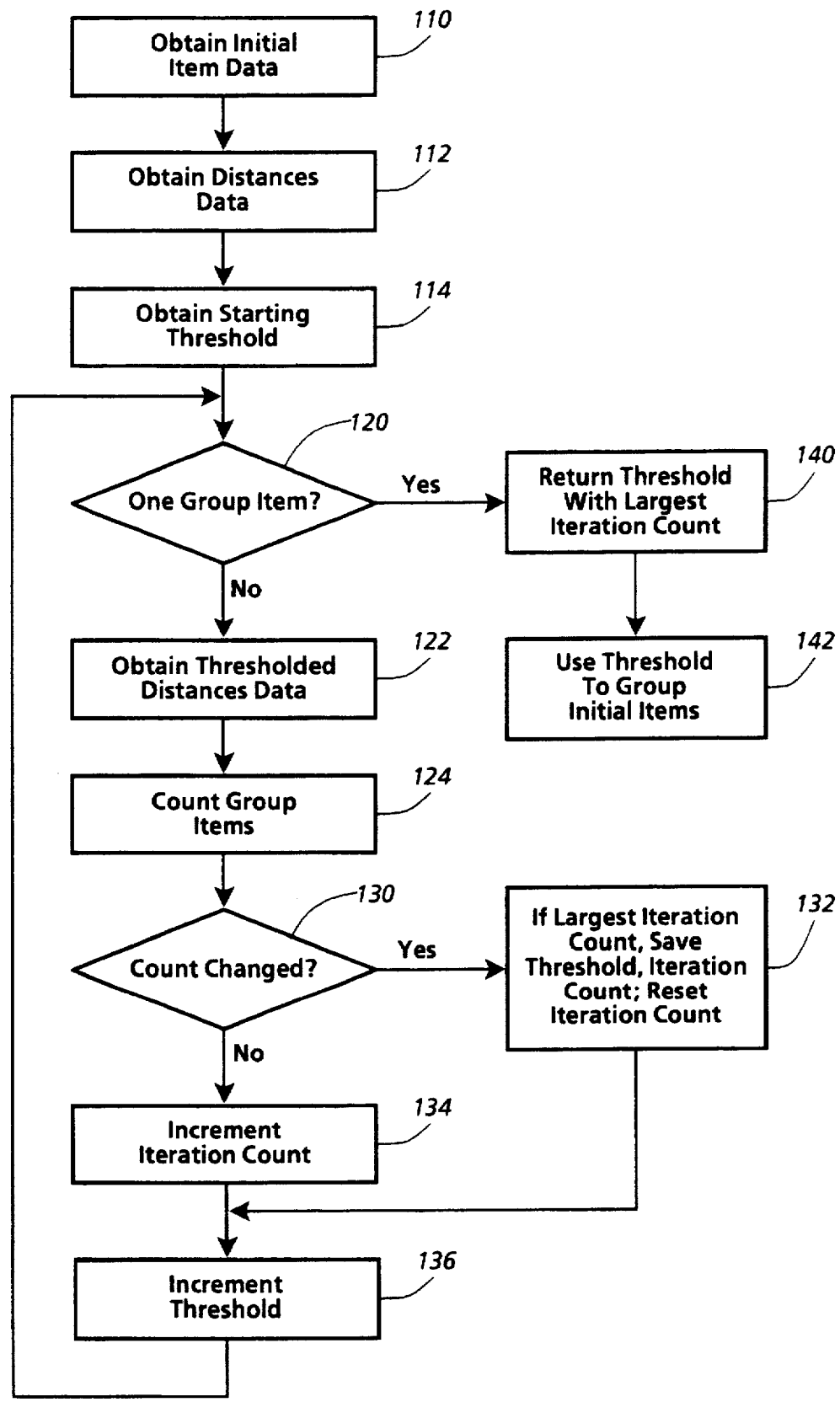
FIG. 4 is a flow chart showing acts in obtaining a threshold by iteratively applying a candidate threshold that is incremented for each iteration.
Figure 5:
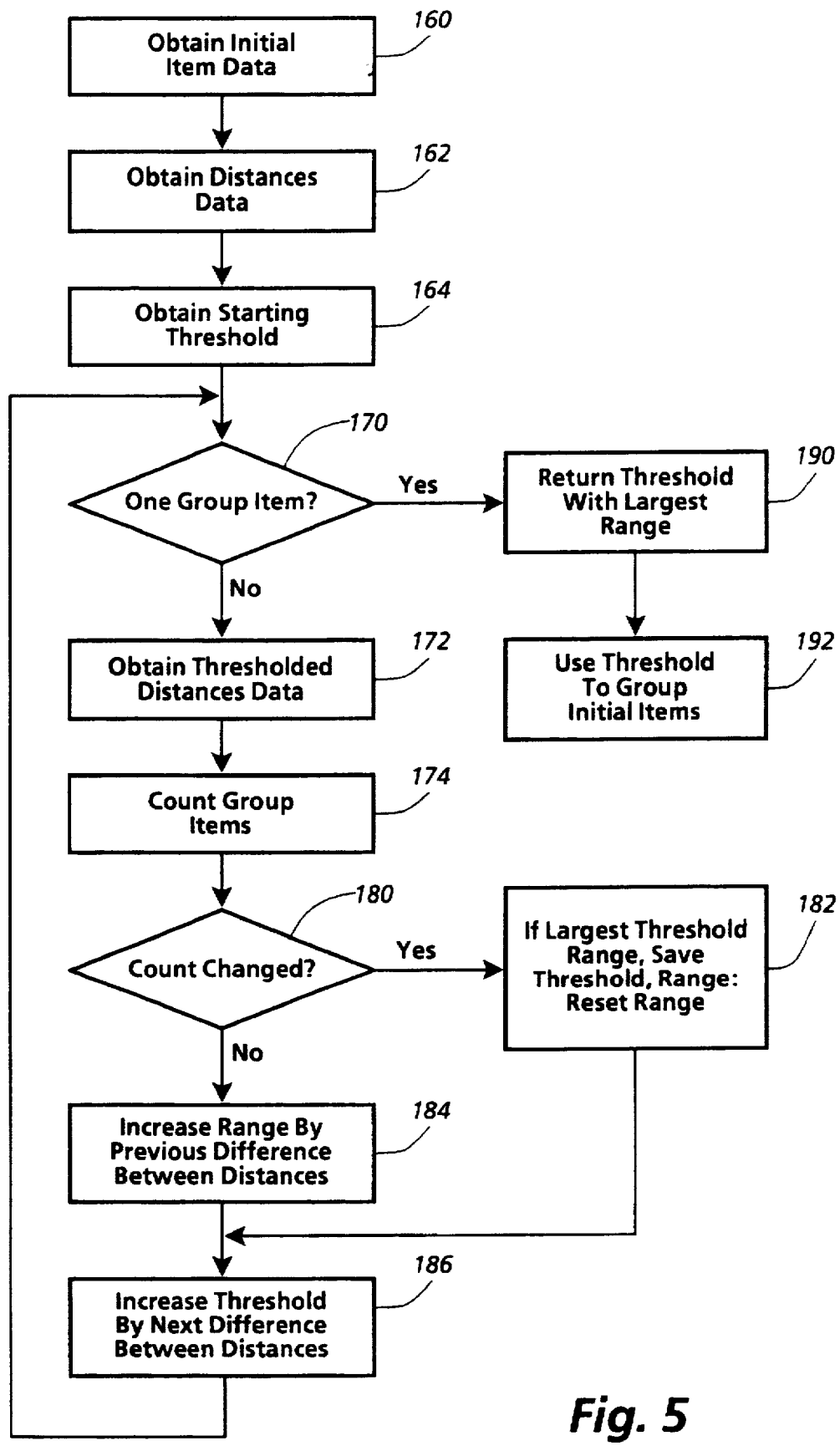
FIG. 5 is a flow chart showing acts in obtaining a threshold by iteratively applying a candidate threshold that is increased for each iteration by a difference between gaps.
Figure 6:
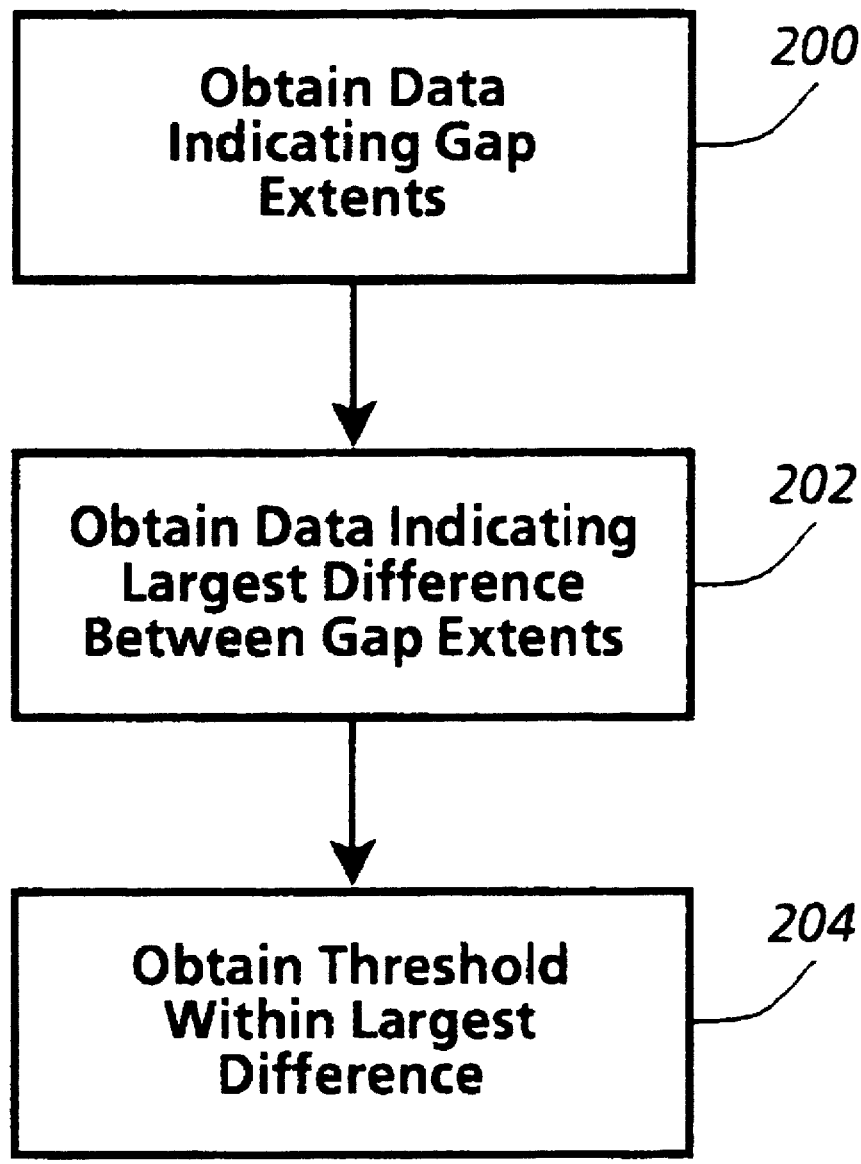
FIG. 6 is a flow chart showing another approach that obtains a threshold within a largest difference between gaps.

Threshold data indicating a threshold as described above in relation to FIGS. 1–3 can be obtained in several ways. FIGS. 4–6 illustrate three examples, in each of which a threshold is obtained that would produce a number of groups; the number of groups is stable across a range of thresholds, and the range of thresholds meets a criterion of largeness for a range.

The approach of FIG. 4 finds a threshold that produces a stable number of groups by iteratively applying thresholds to distances data, with each iteration incrementing the threshold. The approach of FIG. 5 finds a threshold that produces a stable number of groups by iteratively applying thresholds to the distances data, with each iteration increasing the threshold by a difference between distances. The approach of FIG. 6 finds a threshold that produces a stable number of groups by using distances data to obtain differences between distances that occur, and by then using the largest of the differences to obtain a threshold.

In FIG. 4, the act in box 110 obtains initial item data that define an n-dimensional array of items, each indicating a value. The act in box 112 uses the initial item data to obtain distances data indicating a distance for each item in the array. As described above in relation to FIG. 1, the distances data can indicate gaps between items.

The act in box 114 obtains a starting candidate threshold, which can be chosen so that only the smallest distance indicated by the distances data from box 112 is below the starting threshold. The act in box 120 then begins a series of iterations, each of which applies a candidate threshold to the distances data from box 112. The candidate threshold of the first iteration is the starting candidate threshold.

The act in box 122 begins each iteration by using the iteration's candidate threshold to obtain thresholded distances data. The thresholded distances data can indicate, for each item in the array, a thresholded distance value that indicates whether the item's distance indicated by the distances data is above or below the iteration's candidate threshold. For example, the thresholded distance value for an item can be ON if the item's distance is above the candidate threshold, and OFF if the item's distance is below the candidate threshold, or vice versa.

Each iteration's thresholded distances data define a number of distinct group items, with each group item including a set of the items in the array, as illustrated in relation to graph 20 in FIG. 1. The act in box 124 counts the group items, and the act in box 130 branches based on whether the count from box 124 is different than the count from box 124 in the previous iteration.

If the count has changed, the act in box 132 may save data indicating the previous iteration's candidate threshold and a count of iterations that had the same group item count as the previous iteration. The act in box 132 determines whether to save this data by comparing the count of iterations with a count of iterations saved by box 132 in an earlier iteration. If the current count of iterations is greater, then the just-completed subsequence of iterations obtained a stable number of groups over a larger range of thresholds than previous subsequences, so the act in box 132 saves data indicating a candidate threshold and a count of iterations for the just-completed subsequence. Then the act in box 132 resets the iteration count to begin counting iterations having the same group item count as the current iteration.

The effect of the act in box 132 is to apply a criterion for largeness of a range of thresholds. The last candidate threshold saved in box 132 is a threshold that obtained a number of groups that was stable over the largest range of thresholds.

If the count has not changed, the act in box 134 increments the iteration count so that it continues to indicate the number of iterations having the same group item count as the current iteration. The starting candidate threshold from box 114 need not be smaller than the smallest distance between items in the array. Each increment should ideally be small enough to ensure that each possible number of groups is obtained by at least one iteration; if all distances indicated by the distances data are integers, each increment could be one, but if the distances are not all integers each increment could be half the smallest difference between distances.

Before completing the iteration, the act in box 136 increments the candidate threshold to obtain the next iteration's candidate threshold. When the count of group items from box 124 reaches one, the act in box 140 returns the data most recently stored in the act in box 132, indicating a threshold that obtained a grouping with the largest iteration count. The act in box 142 then uses the threshold from box 140 to group the initial items, which can be done similarly to the acts in boxes 122 and 124. The act in box 142 can also provide grouping data indicating, for each group, the initial items in the group.

In FIG. 5, the acts in boxes 160 and 162 can be implemented the same, respectively, as the acts in boxes 110 and 112 in FIG. 4. The act in box 164 obtains a starting candidate threshold, which can be chosen as in box 114 in FIG. 4. The act in box 170 then begins a series of iterations, each of which applies a candidate threshold to the distances data from box 162.

The acts in boxes 172, 174, and 180 can be implemented the same, respectively, as the acts in boxes 122, 124, and 130 in FIG. 4. If the count has changed, the act in box 182 may save data indicating the previous iteration's threshold and a range of thresholds that would have the same group item count as the previous iteration. The act in box 182 determines whether to save this data by comparing the range of thresholds with a range of thresholds saved by box 182 in an earlier iteration. If the current range of thresholds is greater, then the just-completed subsequence of iterations provided a stable number of groups over a larger range of thresholds than previous subsequences, so the act in box 182 saves data indicating a candidate threshold and a range of thresholds for the subsequence. Then the act in box 182 resets a running sum of ranges of thresholds to begin accumulating a range of thresholds that produce the same group item count as the current iteration.

If the count has not changed, the act in box 184 increases the running sum of ranges so that it continues to indicate a range of thresholds that produce the same group item count as the current iteration.

Before completing the iteration, the act in box 186 increases the candidate threshold to obtain the next iteration's candidate threshold. The amount of the increase is a difference between distances indicated by the distances data from box 162, so that the thresholds are only the distances that occur between items defined by the initial item data from box 160. In comparison with the approach of FIG. 4, this can significantly reduce the number of iterations. This is advantageous if the computation necessary to obtain the distance differences data is less than the savings in iterations.

A difference between distances can be obtained when needed by the act in box 186 or all the differences could be obtained in advance and saved for use in box 186.

One way to obtain a difference between distances is to first redistribute the distance values indicated by the distance data from box 162 into a one-dimensional array. To do so, an accumulate operation can be performed, similar to the first pass of the spread operation described in relation to FIG. 7 of copending, coassigned U.S. patent application Ser. No. 08/157,600 entitled "Analyzing an Image Showing a Node-Link Structure" ("the Node-Link Structure Application"). The accumulate operation would save, for each possible distance value up to the highest value that occurs in the distance data image, the maximum value of the pixels in the distance data image that have that value. In contrast to the spread operation, this accumulate operation is performed over each equivalence class of values rather than over each connected component, so that it is inappropriate to label each connected component with a unique identifier before the accumulate operation-each equivalence class can be, in effect, an unconnected figure; also, the accumulate operation need not be followed by a second pass to label the pixels in each equivalence class because the purpose here is to produce a one-dimensional array.

The accumulate operation produces an array in which each distance value that does not occur has the value zero, while each distance value that occurs has its own value. Then rightward and leftward project operations can be performed to replace each zero with the nearest non-zero value to its left or, if none, the nearest non-zero value to its right. Then the resulting array can be shifted once to the left and the unshifted array can be subtracted from the shifted array to obtain a difference array. To obtain the largest difference between distances, an accumulate operation as described above can be performed, and the largest difference with a non-zero value can be obtained from the resulting array. In subsequent iterations, the difference in box 186 in the previous iteration can be used to obtain the next smaller difference with a non-zero value from the resulting array.

The amount of one iteration's threshold increase in box 186 is used as the amount of the next iteration's increase in the running sum of ranges in box 184.

When the count of group items from box 174 reaches one, the act in box 190 returns the data most recently stored in the act in box 182, indicating a threshold that obtained a grouping with the largest range of thresholds. The act in box 192 then uses the threshold from box 190 to group the initial items, which can be implemented the same as box 142 in FIG. 4.

The computational cost of the approach of FIG. 4 is a function of the range of values that occur in the array. For each increment, an iteration must be performed, applying a candidate threshold and counting the resulting groups. The approach of FIG. 5 can reduce the number of iterations that must be performed.

In FIG. 6, the act in box 200 obtains data indicating the extents of gaps that occur in an initial array. The act in box 202 obtains data indicating the largest difference between adjacent gap extents. The act in box 202 can be implemented by sorting the gap extents or loading them into a one-dimensional array as described above in relation to FIG. 5, then obtaining differences between adjacent gap extents and finding the largest difference, which will occur between an upper gap extent and a lower gap extent. The act in box 204 then obtains a threshold that is equal to one of the gap extents between the upper and lower gap extents, and could be the lower gap extent, for example. A threshold between the upper and lower gap extents can then be used with distance data to obtain a number of groups that is stable across a range that meets a criterion of largeness. The range meets the criterion because it is larger than ranges of thresholds across which other numbers of groups are obtained.

The approach in FIG. 6 might also be applied, with appropriate modifications, where an initial array does not include gaps or includes equal gaps. For example, an initial threshold could be applied to color or grey scale pixel values to obtain a version of the initial array that includes gaps.

Grouping data indicating a number of groups that is stable across a range of thresholds that meets a criterion for largeness can be obtained using any of the approaches shown in FIGS. 4–6 or in any other appropriate way.

2. System

Figure 7:
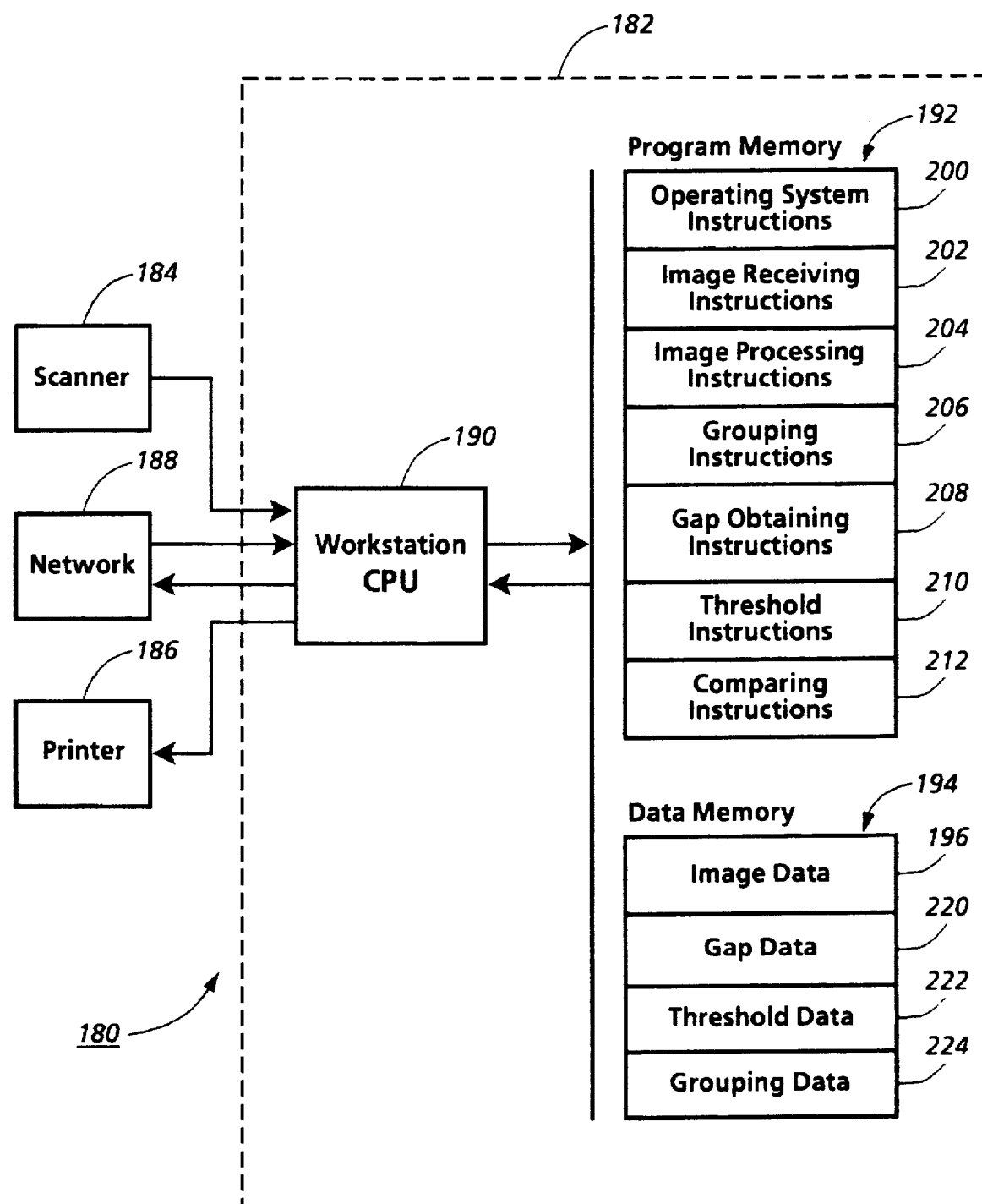
FIG. 7 is a schematic block diagram of a machine that can perform grouping operations in analyzing an image.

FIG. 7 shows a system in which general features described above have been implemented.

System 180 in FIG. 7 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image from scanner 184 or from network 188. In addition, workstation CPU 190 is connected to access program memory 192 and data memory 194 and other conventional workstation peripherals (not shown). Data memory 194 is illustratively storing image data 196 defining an image.

Program memory 192 stores instructions CPU 190 can execute to perform operations implementing the general acts in FIG. 2. CPU 190 executes operating system instructions 200 that provide a Unix operating system or other appropriate operating system. The other instructions stored by program memory 192 make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image and stores it in data memory 194, as illustrated by image data 196. The data defining the image may be received from scanner 184 or network 188.

In executing image processing instructions 204, CPU 190 calls grouping instructions 206. Grouping instructions 206 may treat image data 196 as initial array data or may use image data 196 to produce initial array data defining an initial array in which each item indicates a value. Grouping instructions 206 call gap obtaining instructions 208, threshold instructions 210, and comparing instructions 212.

Gap obtaining instructions 208 can use the initial array data to produce gap data 220 indicating gaps between items in the initial array. Threshold instructions 210 use gap data 220 to produce threshold data 222 indicating a threshold that would produce a number of groups that is stable across a range of thresholds that meets a criterion for largeness of range. Comparing instructions 212 use threshold data 222 to obtain grouping data 224 indicating a grouping of the items in the initial array.

Image processing instructions 204 also perform other operations relating to image analysis.

Many of the acts described below in relation to grouping instructions 206, gap obtaining instructions 208, threshold instructions 210, and comparing instructions 212 are performed on items of data, each of which defines an image. Each item is referred to as a "data image." Some data images can be used in obtaining others. In general, all of the data images define images with the same number of pixels, and each operation produces an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced. Many examples of such operations are described in copending, coassigned U.S. patent application Ser. No. 08/157,600 entitled "Analyzing an Image Showing a Node-Link Structure" ("the Node-Link Structure Application"), and in copending, coassigned U.S. patent application Ser. No. 08/157,804 entitled "Analyzing Image Showing Editing Marks to Obtain Category of Editing Operation" ("the Editing Application"), both of which are incorporated herein by reference.

3. One-dimensional Grouping

Figure 8:
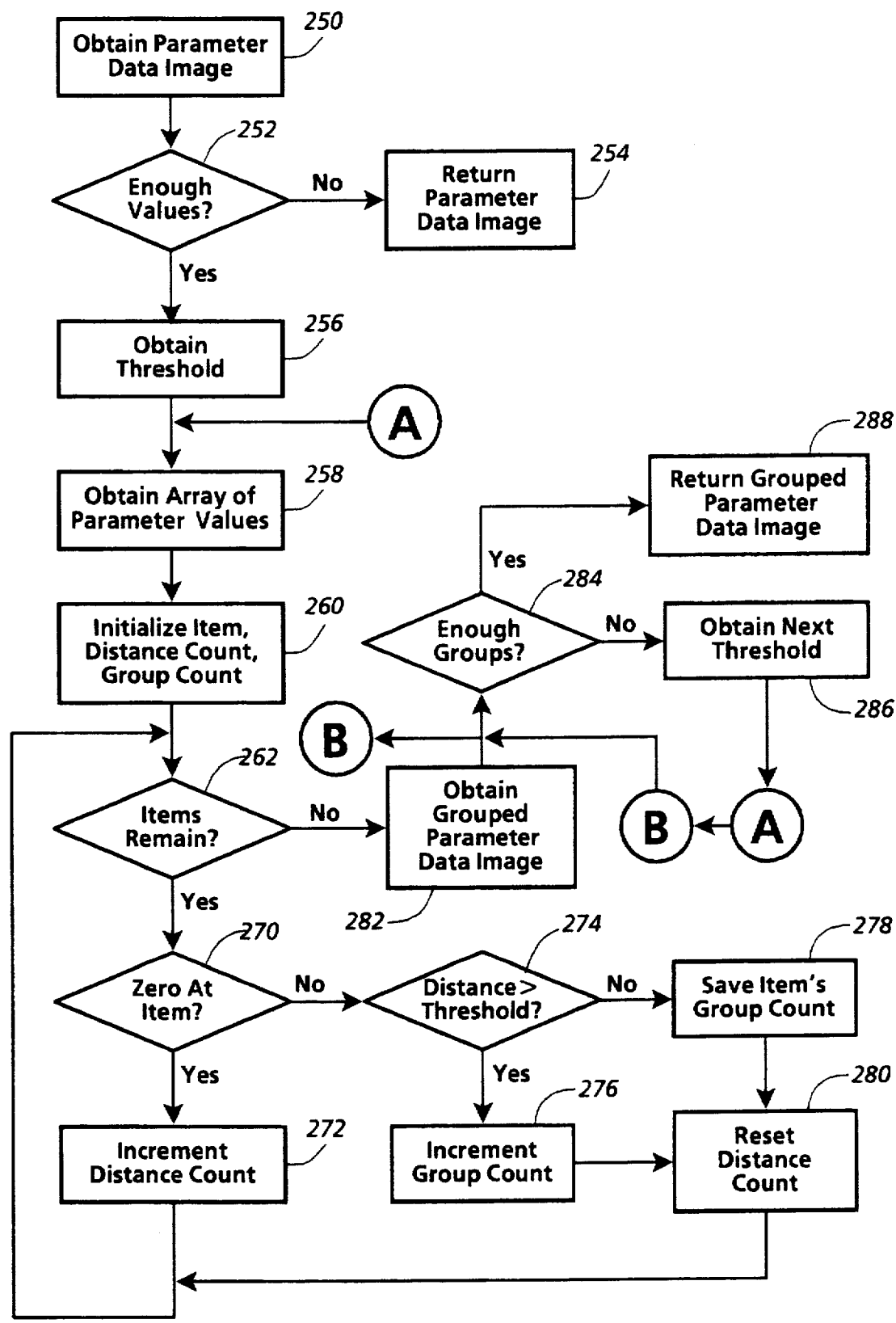
FIG. 8 is a flow chart of acts performed by the machine of FIG. 7 in an implementation of one-dimensional grouping.
Figure 9:
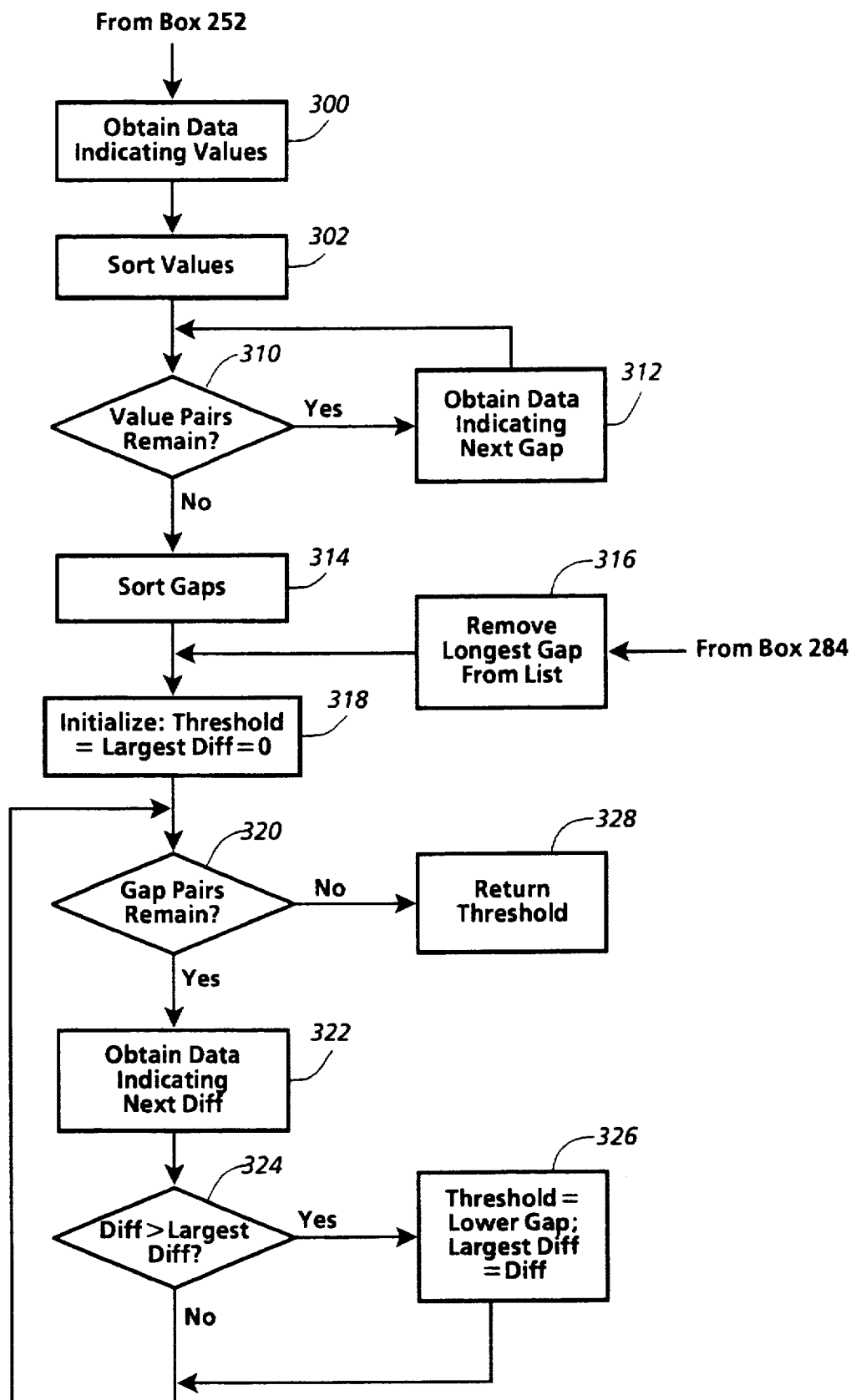
FIG. 9 is a flow chart showing in more detail how a threshold can be obtained in FIG. 8.

FIG. 8 shows acts in executing grouping instructions 206 in FIG. 7 to perform one-dimensional grouping on values from a parameter data image. FIG. 9 shows acts in obtaining a threshold in FIG. 8.

The act in box 250 in FIG. 8 begins by obtaining a parameter data image in which each pixel is labeled with a value of a parameter. The parameter could, for example, be area, elongation, aspect ratio, width, horizontal center of area, vertical center of area, or orientation. Techniques for obtaining such a data image are described in the Node-Link Structure Application and the Editing Application, as well as in copending, coassigned U.S. patent application Ser. Nos. 08/158,132, now issued as U.S. Pat. No. 5,455,898 entitled "Analyzing an Image Showing a Graphical Representation of a Layout"; 08/157,790 entitled "Analyzing an Image Showing a Perimeter Relationship Representation"; 08/158,062, entitled "Analyzing an Image Showing a Parallel Length Graph"; U.S. Ser. No. 08/157,782, now issued as U.S. Pat. No. 5,392,130 entitled "Analyzing an Image Showing a Row/Column Representation"; and U.S. Ser. No. 08/157,856, entitled "Analyzing an Image Showing a Proportioned Parts Graph", all of which are incorporated herein by reference.

The act in box 252 branches based on whether the parameter data image includes a sufficient number of different values for the parameter. Since the number of possible groups is at least one less than the number of different values, the act in box 254 returns the parameter data image from box 250 if there are too few different values to produce a minimum acceptable number of groups. For example, the minimum acceptable number of groups could be two or, eliminating outliers as discussed below, three; the minimum number of different values in box 252 could accordingly be three or, if outliers are being eliminated, four. The act in box 252 can be implemented by scanning the parameter data image to obtain a list of values that occur in it, then obtaining the length of the list and comparing it with the minimum number of different values.

The act in box 256 obtains a threshold that would produce a number of groups that is stable across a range of thresholds that meets a criterion for largeness of range. The act in box 256 can be implemented using the list of values from box 252, as described below in relation to FIG. 9.

The act in box 258 obtains an array in which each item represents a value that the parameter can have. Each item's value indicates whether the parameter data image from box 250 includes a pixel labeled with the value the item represents. The act in box 258 can be implemented by using the parameter data image from box 250 to obtain a binary data image in which each pixel is ON if it has a value greater than zero in the parameter data image. The act in box 258 can then use the binary data image and the parameter data image to perform an accumulate operation, similar to the first pass of a spread operation as described in relation to FIG. 7 of the Node-Link Structure Application. The accumulate operation can use a sum operation to obtain a sum for each label, with each label's sum indicating the number of pixels in the parameter data image that have the label. Or the accumulate operation can use a maximum operation to obtain a binary value for each label, indicating whether or not the label occurs in the parameter data image.

The act in box 260 then initializes a number of variables before beginning a first iterative loop. The current item in the array can be initialized to the zeroth item, for example, and a distance count can be initialized to one more than the threshold to ensure that the distance from the zeroth item to the first item with a non-zero value will not be treated as a gap. A group count can be initialized to zero.

The act in box 262 begins the first iterative loop, in which each iteration after the first advances one item in the array from the item handled in the previous iteration. The first iterative loop continues until the uppermost item in the array is reached.

The act in box 270 begins each iteration by determining whether the iteration's item in the array has the value zero. If so, the act in box 272 simply increments the distance count, so that the distance count indicates the number of zeroes since the last item with a non-zero value.

If the iteration's item has a non-zero value, the act in box 274 branches based on whether the distance count is above threshold. If so, the act in box 276 increments the group count, so that the group count indicates one more than the number of strings of zeroes that extend between non-zero values and that are longer than the threshold. In other words, the group count indicates the number of groups.

If the distance count is below threshold, the act in box 278 saves the current group count so that it can be accessed using data indicating the iteration's item. The act in box 278 can be implemented with a results array that is the same size as the array of items with parameter values, so that each iteration's item in the array of values is in the same position as its item in the results array.

In either case, the act in box 280 resets the distance count to zero so that it can begin counting the next string of zeroes.

When the first iterative loop has visited all the items in the array of values, the act in box 282 can obtain a grouped version of the parameter data image from box 250, in which each pixel with a non-zero label in the parameter data image is labeled with a group number. The act in box 282 can be implemented by a distribute operation, similar to the second pass of a spread operation as described in relation to FIG. 7 of the Node-Link Structure Application. The distribute operation can use the results array from box 278, using each pixel's label in the parameter data image to access an item in the results array, and using the value of the accessed item in the results array to label the pixel in the grouped parameter data image.

The act in box 284 then begins a second iterative loop that continues until the number of groups is at least as great as the minimum acceptable number of groups, discussed above in relation to box 252. This second iterative loop can compensate for outliers that would otherwise result in only two groups—one group including the outlier and the other including all other non-zero values. The technique used in the second iterative loop is to find a threshold that would produce a number of groups that is stable across the next largest range of thresholds when compared with the previous threshold, until the number of groups exceeds the minimum acceptable number of groups, which will be three to compensate for outliers and two if it is not appropriate to compensate for outliers. A threshold that obtains a number of groups exceeding the minimum acceptable number and that is stable across the largest range of thresholds thus meets a criterion for largeness of range.

The second iterative loop is necessary because a grouping stability criterion may produce an inappropriate grouping if an outlier is present. An outlier may be defined as an extremum or near extremum value separated from the next smaller or larger value by the maximal gap. In practice, an outlier may be one of several very large or very small values clustered together.

If an outlier is present, a threshold within the largest range of thresholds with a stable number of groups may have two groups—the outlier in one group and all other non-zero values in the other. In many cases, the grouping into two groups may omit important information about the non-outlier group, such as its subgroups.

The second iterative loop in FIG. 8 illustrates a solution to the outlier problem. If a grouping is obtained with the minimum acceptable number of groups, a threshold within the next largest range of thresholds with a stable number of groups can be used, and so forth, until the minimum acceptable number of groups is obtained. If the minimum acceptable number of groups is three, then the resulting grouping will include information about the subgroups of the non-outlier group.

Since the maximum pixel label in the grouped parameter data image from box 282 is equal to the number of groups, the act in box 284 can be implemented by finding the maximum pixel label and comparing it with the minimum acceptable number of groups. If the number of groups is below the minimum acceptable number, the act in box 286 can obtain the next threshold, similar to the act in box 256, as discussed in more detail below in relation to FIG. 9. Then, the acts in boxes 258, 260, 262, 270, 272, 274, 276, 278, 280, and 282 can be performed for the next threshold, as indicated by the circles with letters "A" and "B" in FIG. 8. The new grouped parameter data image from box 282 can then be used again in box 284. When the number of groups reaches the minimum acceptable number, the act in box 288 returns the grouped parameter data image obtained most recently.

The technique in FIG. 9 can be used to implement the acts in boxes 256 and 286 in FIG. 8. The technique in FIG. 9 generally follows the acts in FIG. 6, but any of the techniques in FIGS. 4–6 could be used to obtain thresholds.

The act in box 300 obtains data indicating values. As shown, the data indicating values can be a list of values obtained as described above in relation to box 252 in FIG. 8. The act in box 302 sorts the values obtained in box 300 to produce a sorted list of values.

The act in box 310 begins an iterative loop that handles each adjacent pair of values in the sorted list. For each pair of values, the act in box 312 obtains data indicating a gap between the values. The act in box 314 then sorts the gaps to obtain a sorted list of gaps.

Alternatively, after the act in box 284 determines that the number of groups is not sufficient, the act in box 316 can obtain a sorted list of gaps by removing the largest gap from the previous sorted list of gaps.

The act in box 318 prepares for another iterative loop by initializing a threshold variable and a largest difference variable to zero. The act in box 320 then begins the iterative loop, which handles each adjacent pair of gaps in the sorted list of gaps from box 314 or from box 316. For each pair of gaps, the act in box 322 obtains data indicating a difference between the gaps. The act in box 324 then compares the difference from box 322 with the largest difference variable. If the difference from box 322 is greater, the act in box 326 updates the threshold variable to the smaller of the two gaps in the current pair and updates the largest difference variable to the difference from box 324.

When all the pairs of gaps have been handled, the act in box 328 returns the value of the threshold variable.

The technique in FIGS. 8 and 9 can perform one-dimensional grouping of several different types. The current implementation provides several types of global similarity grouping—area similarity, elongation similarity, aspect ratio similarity, width similarity, horizontal center of area similarity, vertical center of area similarity, and orientation similarity. Global similarity grouping could also be performed for other parameters.

One-dimensional grouping might also be implemented to perform local similarity grouping, to group values of a property measured only between neighboring connected components in an image. Local similarity grouping might be implemented for a number of parameters, with local parallelism grouping and local colinearity grouping being of particular interest. Local similarity grouping can combine a proximity and similarity constraint. The proximity constraint could be that only immediate Voronoi neighbors would be grouped, with no thresholding of distances between neighbors. Instead, a threshold that produces a stable number of groups across a larger range of thresholds, as described above, could be applied to values of a similarity parameter. The similarity parameter could be size, in which case a threshold could be applied to absolute values of size differences. The similarity parameter could be parallelism, in which case a threshold could be applied to differences in orientation. The similarity parameter could be alignment, in which case a threshsold could be applied to differences in baseline.

3. Two-dimensional Grouping

Figure 10:
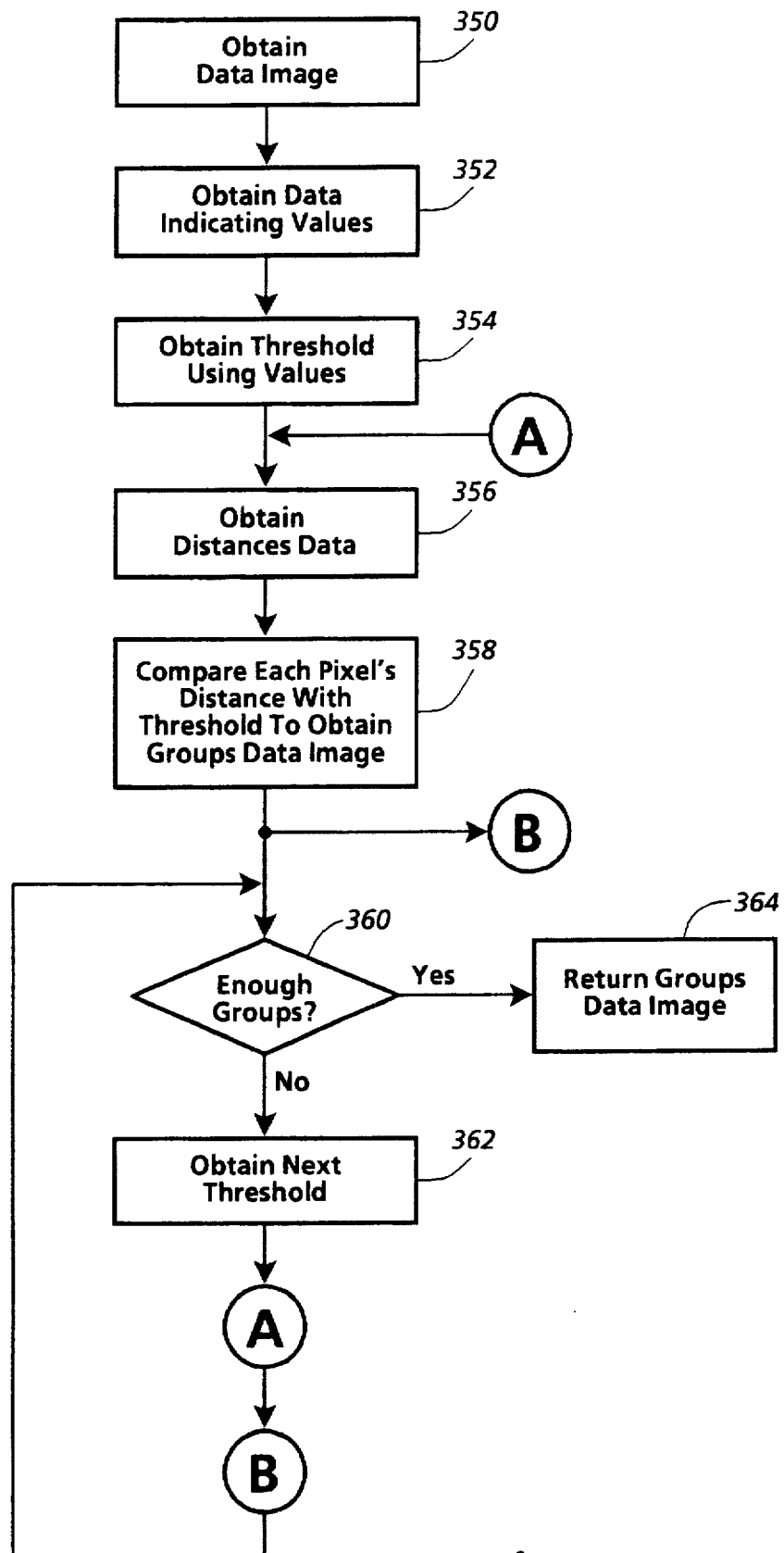
FIG. 10 is a flow chart of acts performed by the machine of FIG. 7 in an implementation of two-dimensional grouping.
Figure 11:
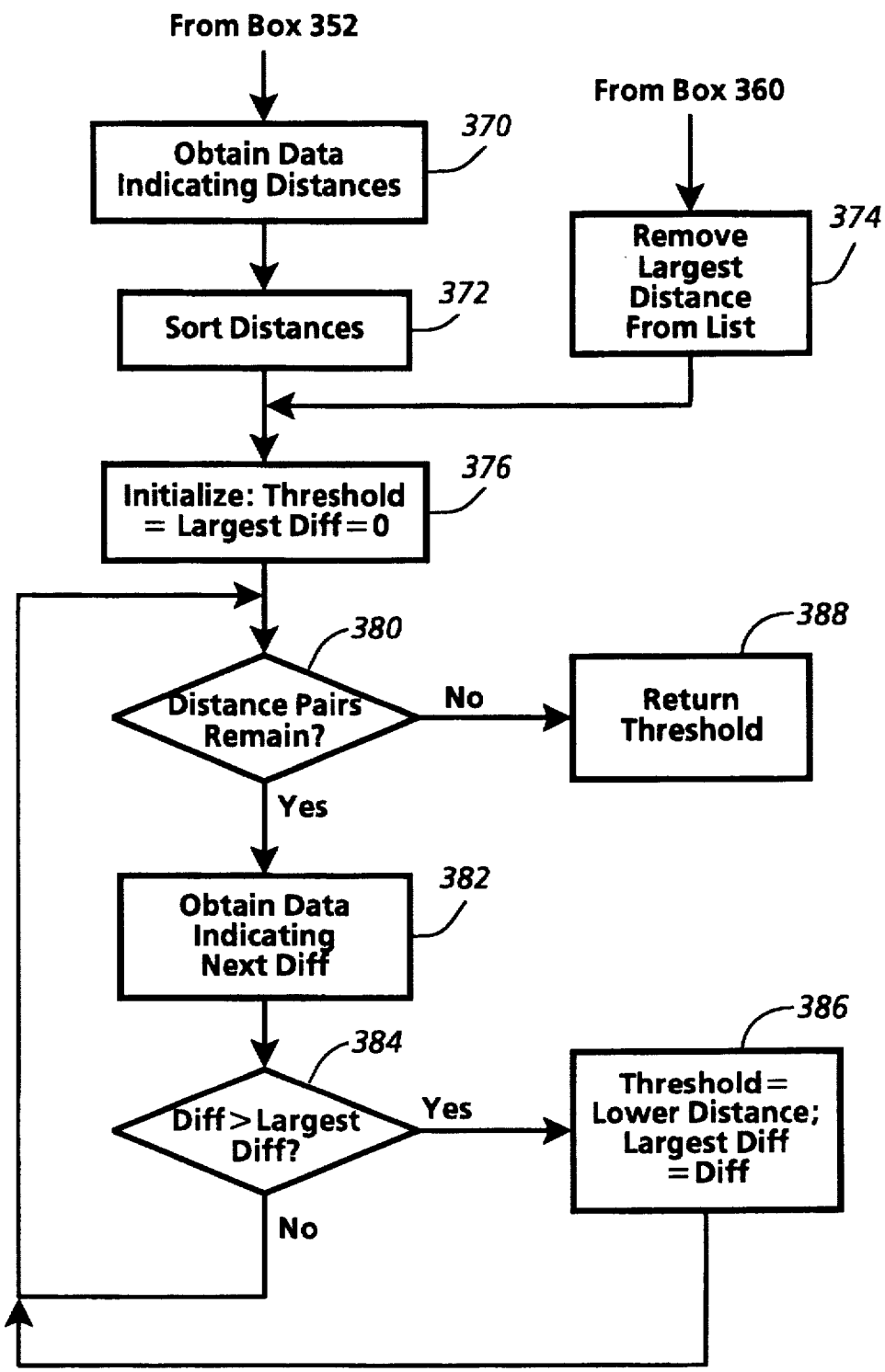
FIG. 11 is a flow chart showing in more detail how a threshold can be obtained in FIG. 10.

FIG. 10 shows acts in executing grouping instructions 206 in FIG. 7 to perform grouping for items in a two-dimensional array. FIG. 11 shows acts in obtaining a threshold in FIG. 10.

The act in box 350 in FIG. 10 begins by obtaining a data image in which each pixel is labeled with a value of a parameter. Techniques for obtaining such a data image are described in the applications cross-referenced above in relation to box 250 in FIG. 8.

The act in box 352 uses the data image from box 350 to obtain data indicating values. The act in box 352 can be implemented in various ways, some of which are discussed below in relation to specific types of grouping. The act in box 356 uses the values from box 352 to obtain a threshold that would produce thresholded distance data defining a number of groups. The number of groups is stable across a larger range of thresholds than another number of groups. The act in box 356 can be implemented as described below in relation to FIG. 11.

The act in box 356 uses the data image from box 350 to obtain a distances data image in which each pixel is labeled with a distance to a near neighbor, in the data image from box 350, in the complement of the data image from box 350, or in another appropriate related data image. The act in box 356 can be implemented as described in relation to FIG. 7 of the Node-Link Structure Application.

The act in box 358 compares each pixel's distance in the distances data image from box 356 to the threshold from box 354 to obtain a groups data image in which a pixel is ON if its distance compares appropriately with the threshold. The groups data image defines a number of groups of pixels, each including at least one connected component from the data image from box 350. The comparison in box 358 can be either for distances above or below the threshold, as discussed below in relation to specific types of grouping.

The act in box 360 begins an iterative loop that continues until the number of groups is at least as great as the minimum acceptable number of groups, discussed above in relation to FIG. 8. The iterative loop can compensate for outliers that would otherwise result in only two groups—one group including the outlier and the other including all other connected components. The technique used in the iterative loop is to find a threshold that would produce a number of groups that is stable across the next largest range of thresholds when compared with the previous threshold, until the number of groups exceeds the minimum acceptable number of groups, which will be three to compensate for outliers and two if it is not appropriate to compensate for outliers. Other strategies could alternatively be used to compensate for outliers, such as first grouping connected components based on area, then removing any connected components in the group with the smallest areas.

The act in box 360 can be implemented by counting the number of connected components in the groups data image from box 358, and by then comparing the number with the minimum acceptable number of groups. The number of connected components can be obtained by first labeling each pixel in a connected component with a unique identifier for the connected component as described in relation to FIG. 7 of the Node-Link Structure Application. If the unique identifiers together form a dense set of integers starting with one, the number can be obtained simply by obtaining the maximum unique identifier.

If the number of groups is below the minimum acceptable number, the act in box 362 can obtain the next threshold, similar to the act in box 354, as discussed in more detail below in relation to FIG. 11. Then, the acts in boxes 356 and 358 can be performed for the next threshold, as indicated by the circles with letters "A" and "B" in FIG. 10. Note, however, that it is not necessary to repeat the act in box 356 if the previous result was saved. The new groups data image from box 358 can then be used again in box 360. When the number of groups reaches the minimum acceptable number, the act in box 364 returns the groups data image obtained most recently.

The groups data image could be used to obtain a group label data image in which each pixel in a connected component in the data image from box 350 is labeled with a number identifying the group that includes the connected component. As described in relation to box 360, each pixel in a connected component in groups data image from box 364 can be labeled with a unique identifier for its connected component, where the unique identifiers form a dense set of integers starting with one. The resulting labeled groups data image is similar to the grouped parameter data image from box 288 in FIG. 8.

The technique in FIG. 11 can be used to implement the acts in boxes 354 and 362 in FIG. 10. The technique in FIG. 11 generally follows the acts in FIG. 6, but any of the techniques in FIGS. 4–6 could be used to obtain thresholds.

The act in box 370 obtains data indicating distances. As shown, the data indicating distances can be obtained after obtaining indicating values from box 352 in FIG. 10. The act in box 372 sorts the distances obtained in box 370 to produce a sorted list of distances.

Alternatively, after the act in box 360 determines that the number of groups is not sufficient, the act in box 374 can obtain a sorted list of distances by removing the largest distance from the previous sorted list of distances.

The act in box 376 prepares for an iterative loop by initializing a threshold variable and a largest difference variable to zero. The act in box 380 then begins the iterative loop, which handles each adjacent pair of distances in the sorted list of distances from box 372 or from box 374. For each pair of distances, the act in box 382 obtains data indicating a difference between the distances. The act in box 384 then compares the difference from box 382 with the largest difference variable. If the difference from box 382 is greater, the act in box 386 updates the threshold variable to the smaller of the two distances in the current pair and updates the largest difference variable to the difference from box 384.

When all the pairs of distances have been handled, the act in box 388 returns the value of the threshold variable.

4. Examples

Figure 12:
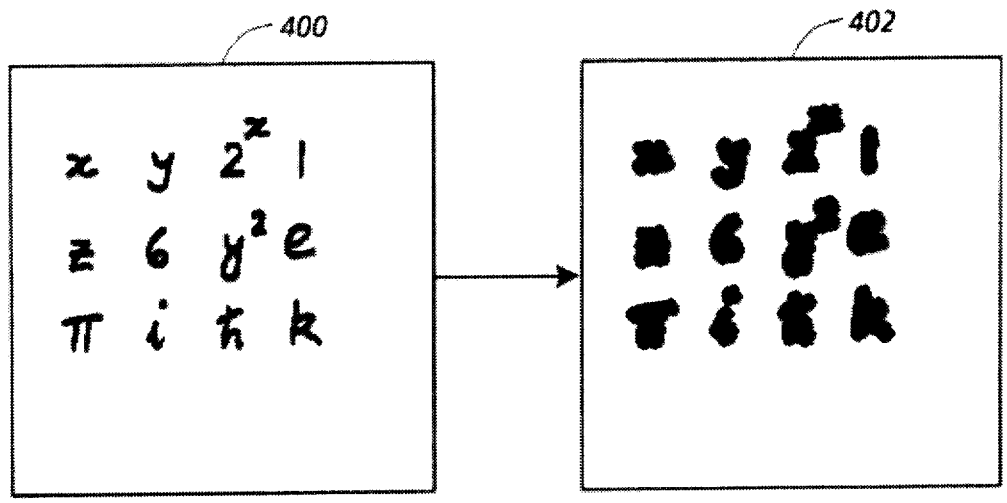
FIG. 12 shows an example of an input image and a grouped image resulting from spatial clustering.
Figure 13:
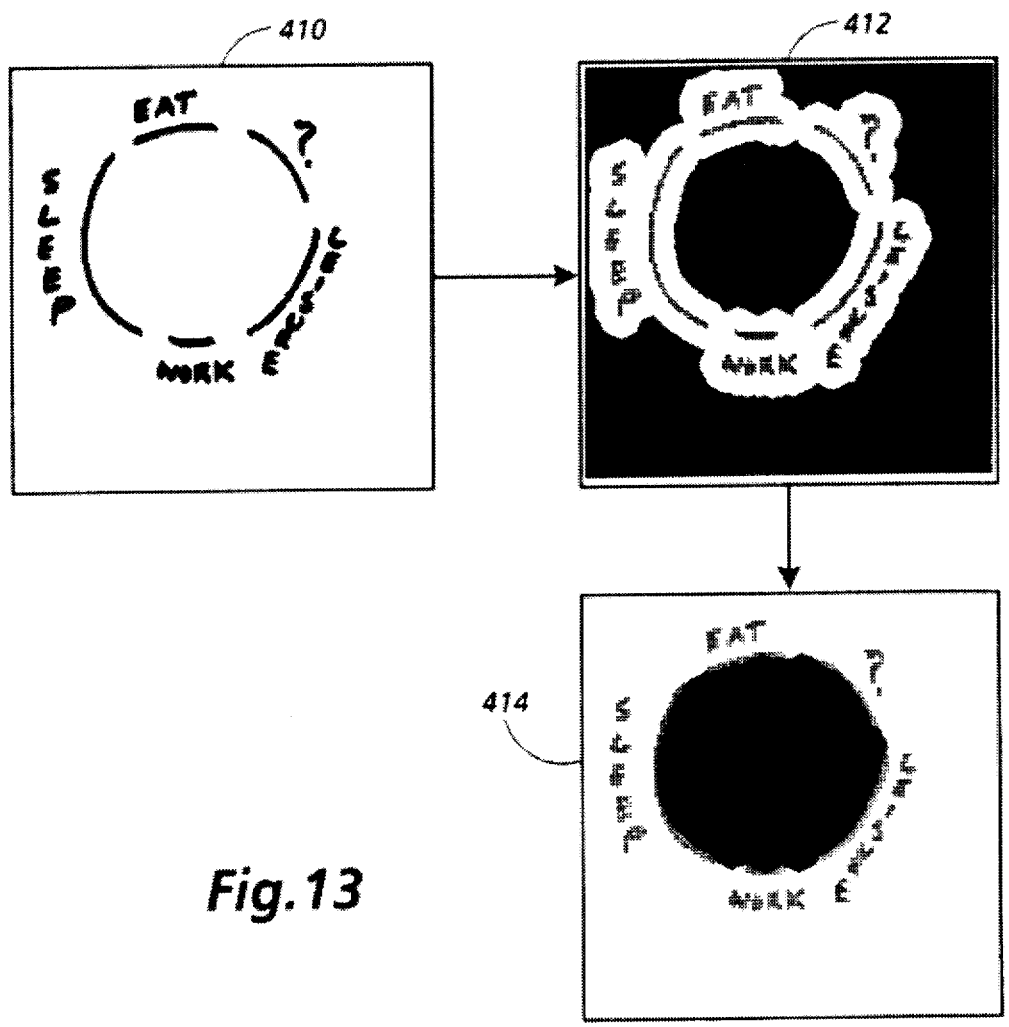
FIG. 13 shows an example of an input image and a grouped image resulting from segmentation of partially bounded regions.
Figure 14:
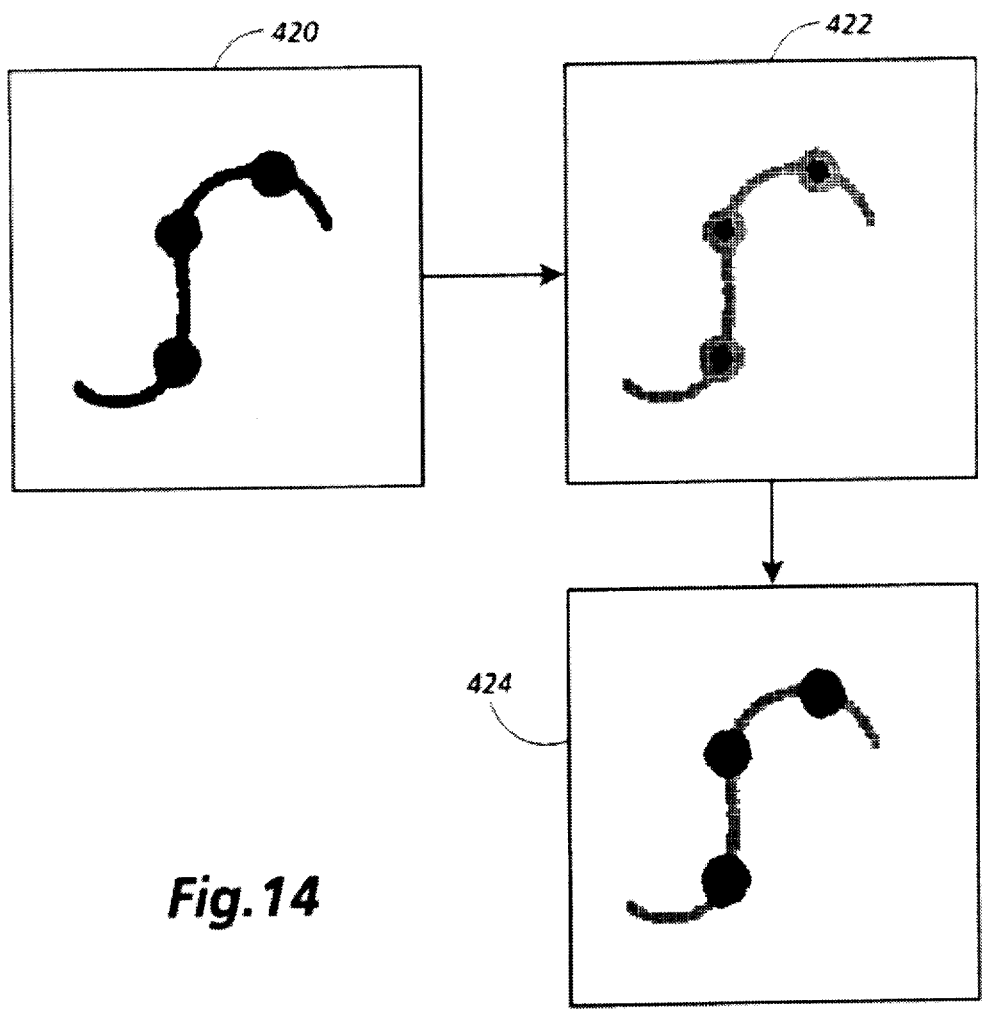
FIG. 14 shows an example of an input image and a grouped image resulting from segmentation by local width.
Figure 15:
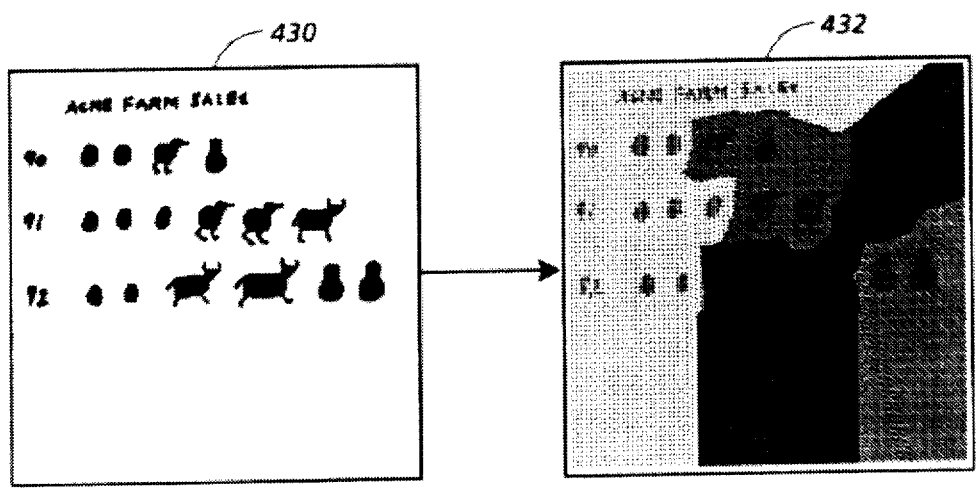
FIG. 15 shows an example of an input image and a grouped image resulting from global similarity grouping.

The techniques described above can be used to perform several different types of grouping, including clustering, segmentation of images, and similarity grouping. FIGS. 12–15 illustrate several types of grouping that have been implemented using techniques described above. FIGS. 12–14 illustrate proximity grouping of three types—spatial clustering, segmentation of partially bounded regions, and segmentation by local width. FIG. 15 illustrates global similarity grouping.

As can be seen from FIGS. 12–15, each type of grouping obtains equivalence classes that may be useful for image processing. The resulting groups may be more meaningful than the items they include if they reflect meaningful scene structure, such as objects of interest. Grouping can play an important role in operations that are performed on parts of an image rather than on the image as a whole. By operating on groups, rather than on individual pixels, analysis may proceed in a coarse to fine manner.

Each of the following examples of proximity grouping uses an input image to obtain a grouped image that shows equivalence classes. Each example uses data defining its input image to obtain gap data indicating gaps between items in the data defining the input image, but each example obtains its gap data differently. Each example uses its gap data to obtain a threshold, using an approach similar to that of FIG. 6 so that the threshold would produce a number of groups that is stable across a range of thresholds that meets a criterion for largeness. Each example also uses data defining its input image to obtain a distances data image indicating a distance for each pixel in the input image, but some examples obtain a distances data image differently than others. Each example compares its threshold with its distances data image to obtain data defining its grouped image, so that pixels with distances above the threshold are separated from pixels with distances above the threshold. Some examples then use data defining the grouped image to perform further operations.

In FIG. 12, input image 400 shows alphanumerical characters that form terms that are perceptible as an array with three rows and four columns. Grouped image 402 shows how spatial clustering produces twelve connected components, one for each row/column combination. Each connected component in grouped image 402 includes one or more of the connected components in input image 400, so that grouping of pixels into connected components provides information that can be used to group connected components.

To perform spatial clustering as in FIG. 12, the gap data can be obtained by applying a foreground neighbor border criterion that requires a pixel that is on a border between parts of the input image in which pixels have different near neighbors in the foreground, i.e. different black near neighbors. The criterion can be applied by using input image 400 to obtain a Voronoi edge data image in which each pixel at an edge between two Voronoi regions is labeled with a unique identifier for the edge. Each pixel with a non-zero value in the Voronoi edge data image meets the criterion.

The Voronoi edge data image can be obtained by first performing a swap operation on a neighbor identifier data image, then gating the result with a tesselation data image, and then labeling each pixel that has a positive value in the gated data image with the concatenation of its positive value and its value in the neighbor identifier data image.

The neighbor identifier data image can be obtained by first obtaining a component identifier data image in which each pixel in a connected component is labeled with a unique identifier for the connected component, as described in relation to FIG. 7 of the Node-Link Structure Application. Then, the component identifier data image can be used to perform a read operation as described in relation to FIG. 13 of the Editing Application, using x and y near neighbor offsets to obtain the neighbor identifier data image in which each pixel is labeled with the unique identifier of a connected component that is a near neighbor.

The swap operation can be performed on the neighbor identifier data image by first performing four shift operations so that each pixel has, in addition to its value in the neighbor identifier data image, the value of each of its four-connected neighbor pixels, referred to as left, right, up, and down.

Then, at each pixel that has a non-zero value in the neighbor data image, the pixel's value can be compared with its left, up, right, and down, returning the value of the first neighboring pixel that is different than the pixel's value in the neighbor data image. If none of the neighboring pixel's have a different value, the pixel's value after the swap operation is zero.

The neighbor identifier data image can also be used to obtain the tesselation data image. The tesselation data image is a version of the neighbor identifier data image in which each pixel is ON if it has a four-connected neighbor that has a different value in the neighbor identifier data image, which can be obtained as an edges data image as described in relation to FIG. 7 of the Node-Link Structure Application, but comparing integer labels from the neighbor identifier data image rather than binary labels. The tesselation data image can be used to gate the swapped neighbor data image so that, in the gated data image, each pixel that is ON in the tesselation data image is labeled with its value in the swapped neighbor data image, while other pixels are OFF.

A foreground neighbor distances data image can be obtained indicating, for each pixel, a distance to a near neighbor in the foreground of input image 400. The pixels in each edge in the Voronoi edge data image can then be labeled with the smallest foreground neighbor distance for pixels in the edge to obtain a gap data image. A spread operation as described in relation to FIG. 7 of the Node-Link Structure application can be performed to obtain the gap data image.

The gap data can be a list of the distances that occur in the gap data image or an array indicating, for each distance, whether it occurs. The gap data can be used to obtain a threshold as described above. The threshold can then be compared with each pixel's value in the foreground neighbor distances data image to obtain data defining grouped image 402, in which a pixel is ON only if its distance in the foreground neighbor distances data image is less than or equal to the threshold distance. Also, the minimum acceptable number of groups can be three to eliminate outliers; otherwise, it could be two.

Segmentation of partially bounded regions as in FIG. 13 can obtain meaningful regions that are not defined by closed, connected bounding contours. Such regions are referred to as "partially bounded regions," and examples include regions defined by dotted or dashed boundaries and boundaries in which spaces may be quite wide. Partially bounded regions cannot be extracted based on connectivity of boundaries, but could in some cases be extracted by transforming disconnected boundary elements into a connected boundary. Proximity grouping, however, can extract partially bounded regions directly, without a connected boundary, by applying a threshold distance to distances at narrowings of the background region, which occur at spacings between foreground components. The narrowings can be distinguished based on background ridge points with near neighbor boundary points that are nearly diametrically opposed.

To perform segmentation of partially bounded regions as in FIG. 13, the gap data can be obtained by applying an opposing foreground neighbor border criterion that requires a pixel that is on a border between parts of the input image in which pixels have near neighbors in the foreground that are approximately 180° apart. The criterion can be applied by using input image 410 to obtain a direction data image in which each pixel is labeled with a direction to a near neighbor, then using the direction data image to obtain a direction difference data image, and then comparing each pixel's value in the direction difference data image with a criterion angle, such as 140 degrees, to obtain a large angle data image in which each pixel is ON if its value in the direction difference data image is greater than the criterion angle.

The direction difference data image can be obtained by labeling each pixel with the absolute values of its differences from the four four-adjacent pixels, then obtaining the maximum of the absolute values.

A foreground neighbor distances data image can be obtained indicating, for each pixel, a distance to a near neighbor in the foreground of input image 410. The pixels in each connected component in the direction difference data image can then be labeled with the largest foreground neighbor distance for pixels in the connected component to obtain a gap data image. A spread operation can be performed to obtain the gap data image.

The gap data can be a list of the distances that occur in the gap data image or an array indicating, for each distance, whether it occurs. The gap data can be used to obtain a threshold as described above. The threshold can then be compared with each pixel's value in the foreground neighbor distances data image to obtain data defining grouped image 412, in which a pixel is ON only if its distance in the foreground neighbor distances data image is greater than the threshold distance.

In grouping to segment partially bounded regions, group image 412 can be referred to as a partial ground data image. The partial ground data image can be used to obtain other data images.

One technique can obtain a partial exterior data image by first ANDing the partial ground data image with a border data image in which pixels at the image border are ON. A coloring operation, described in relation to FIG. 7 of the Node-Link Structure Application, can be performed on the partial ground operation using the ANDed data image as a seed to produce the partial exterior data image.

Another technique can perform a remove or set difference operation, described in relation to FIG. 7 of the Node-Link Structure Application, to remove each connected component in the partial exterior data image from the partial ground data image, producing a partial holes data image. A growing or thickening operation can then be performed on the partial holes data image to increase it by approximately the threshold to fill an interior region, as illustrated by image 414 in FIG. 13.

Another technique can obtain a partial boundaries data image in which each pixel is ON that is a Voronoi neighbor (i.e. in an adjacent Voronoi region) of a pixel that is ON in the partial holes data image.

Segmentation by local width as in FIG. 14 decomposes foreground connected components into a larger number of distinct connected components. Such segmentation makes it possible to treat a connected shape as a superimposition of simpler shapes, so that each of the component shapes can be handled separately. For example, a threshold can be applied to differences in width among the component shapes if compact shapes are superimposed on narrower curvilinear figures. Narrowings in foreground connected components can be distinguished in much the same way narrowings in background regions are distinguished in segmentation of partially bounded regions.

If a uniform threshold is applied at all positions, the superimposed components must all be of similar width and the components on which they are superimposed must also be of similar width. A superimposed component cannot be separated from a line if the difference in width is smaller than the difference between the superimposed component and some larger superimposed component. The difference in width between the smallest superimposed component and the line must be greater than the difference between any two superimposed components.

To perform segmentation by local width as in FIG. 14, the gap data can be obtained by applying an opposing background neighbor border criterion that requires a pixel that is on a border between parts of the input image in which pixels have near neighbors in the background that are approximately 180° apart. The criterion can be applied by using input image 420 to obtain a direction data image in which each pixel is labeled with a direction to a near neighbor in the background or complement of input image 420, then using the direction data image to obtain a direction difference data image, and then a large angle data image in which each pixel is ON if its value in the direction difference data image is greater than a criterion angle, as described above in relation to FIG. 13.

The complement of input image 420 can also be used to obtain a background neighbor distances data image can be obtained indicating, for each pixel, a distance to a near neighbor in the background of input image 420. The pixels in each connected component in the direction difference data image can then be labeled with the largest background neighbor distance for pixels in the connected component to obtain a gap data image. A spread operation can be performed to obtain the gap data image.

The gap data can be a list of the distances that occur in the gap data image or an array indicating, for each distance, whether it occurs. The gap data can be used to obtain a threshold as described above. The threshold can then be compared with each pixel's value in the background neighbor distances data image to obtain data defining grouped image 422, in which a pixel is ON only if its distance in the foreground neighbor distances data image is greater than the threshold distance. The grey pixels in grouped image 422 indicate pixels that were ON in input image 420 but are not ON in grouped image 422 because their background neighbor distances are below the threshold.

In grouping to segment by local width, grouped image 422 can be referred to as a partial foreground data image. The partial foreground data image can be used to obtain other data images. For example, a growing or thickening operation can be performed on the partial foreground data image to increase it by approximately the threshold to obtain a data image showing the full size foreground components in input image 420, as illustrated by image 424 in FIG. 14.

Global similarity grouping as in FIG. 15 groups features with similar values of a given property into an equivalence class, without regard to spatial arrangement. Before grouping, each pixel can be labeled with a value of a parameter for a connected component or other feature that includes the pixel. Parameter values that occur in the labeled data image can then be grouped as described above for one-dimensional grouping. After grouping, pixels with values in the same group can all be given the same label for the group, so that all pixels with values in a group have the same label.

To perform global similarity grouping as in FIG. 15, the gap data can be obtained by first using input image 430 to obtain an area data image in which each pixel in a connected component in input image 430 is labeled with the area of the connected component. A technique for performing a spread operation to obtain an area data image is described in relation to FIG. 7 of the Node-Link Structure Application. Then, the values that occur in the area data image can be used to obtain a one-dimensional array in which each item represents a value of area and each item indicates the value it represents only if that value occurs in the area data image.

Gap data can be obtained by performing project operations on the array to obtain a filled array, shifting the filled array, and taking a difference between the filled array and the shifted filled array, as described above, to obtain a list of differences or to obtain another array indicating, for each difference, whether it occurs. The gap data can be used to obtain a threshold as described above, by finding the largest difference between gap extents. The threshold can then be compared with the differences between non-zero values in the array to obtain grouping data indicating equivalence classes of the values of area. Each equivalence class can be given a unique identifier, and grouped image 432 can be obtained in which each pixel with a non-zero value in the area data image is labeled with the unique identifier of the equivalence class that includes the value. The difference identifiers are represented in grouped image 432 by different patterns of grey.

Another example, not shown, is local similarity grouping, which combines proximity and similarity constraints. In local similarity grouping, values of a parameter are compared only among Voronoi neighbors.

5. Variations

The implementations described above use particular operations described above to obtain gap data, to obtain thresholds, and to use the thresholds to perform particular types of grouping. Numerous other combinations of operations besides those described above could be used to obtain gap data, to obtain thresholds, and to perform grouping. Numerous other types of grouping could be performed using thresholds obtained as described above. In particular, grouping to perform figure/ground separation can be combined with spreading operations to label each pixel in an equivalence class; then a coloring or other selecting operation can be performed to obtain parts of an image that include one equivalence class; then a further grouping operation can be performed, etc.

The implementations described above apply a single-valued threshold to a distance for each item in an array. The implementations might be modified to apply a threshold that is a function that can assume different values at different positions in an array, such as a function of position or of context. For example, a threshold at a given position could be a function of a near neighbor's distance to its near neighbor or of any other value with which the position can be labeled.

The implementations described above obtain integer thresholds and then apply comparison operators such as greater than (>) and less than or equal to (≦) to obtain a binary value at each position in an array. The implementations could be modified to use non-integer thresholds, and other comparison operators could be used, including less than (<) and greater than or equal to (≧). The implementations might even be modified to apply different comparison operators at different positions.

The implementations described above can perform grouping on data that defines an image, either to group connected components or to group values of labels for parameters of features in the image. The implementations could perform grouping on other types of data. Further the implementations described above can perform one-dimensional and two-dimensional grouping, but could be extended to perform n-dimensional grouping, either as a general case or for a specific value of n.

The mix of component-serial and component-parallel operations could be varied in any appropriate way; all operations could be component-parallel, all could be component-serial, or some could be component-parallel and others component-serial. For example, rather than performing component-parallel operations to obtain thresholded data, component-serial operations could be performed in which connected components are considered pairwise to determine whether the distances between them are less than a threshold.

The implementations described above use currently available image processing techniques, but could readily be modified to use newly discovered image processing techniques as they become available.

The implementations described above operate on binary images, but could be extended to operate on color or gray scale images, either directly or after binarization.

In many cases, the implementations described above perform acts in a specific order that could instead be performed in another order. In FIG. 8, for example, the order in which the threshold and array of parameter values is obtained in boxes 256 and 258 is indifferent, and initialization in box 260 could be done at any point before the iterative loop that begins in box 262.

The implementations described above can obtain grouping data in the form of a data image in which a pixel is labeled with a unique identifier of the group that includes it. Other types of items data could be obtained, such as a list of groups, indicating for each group unique identifiers of connected components that the group includes.

Figure 16:
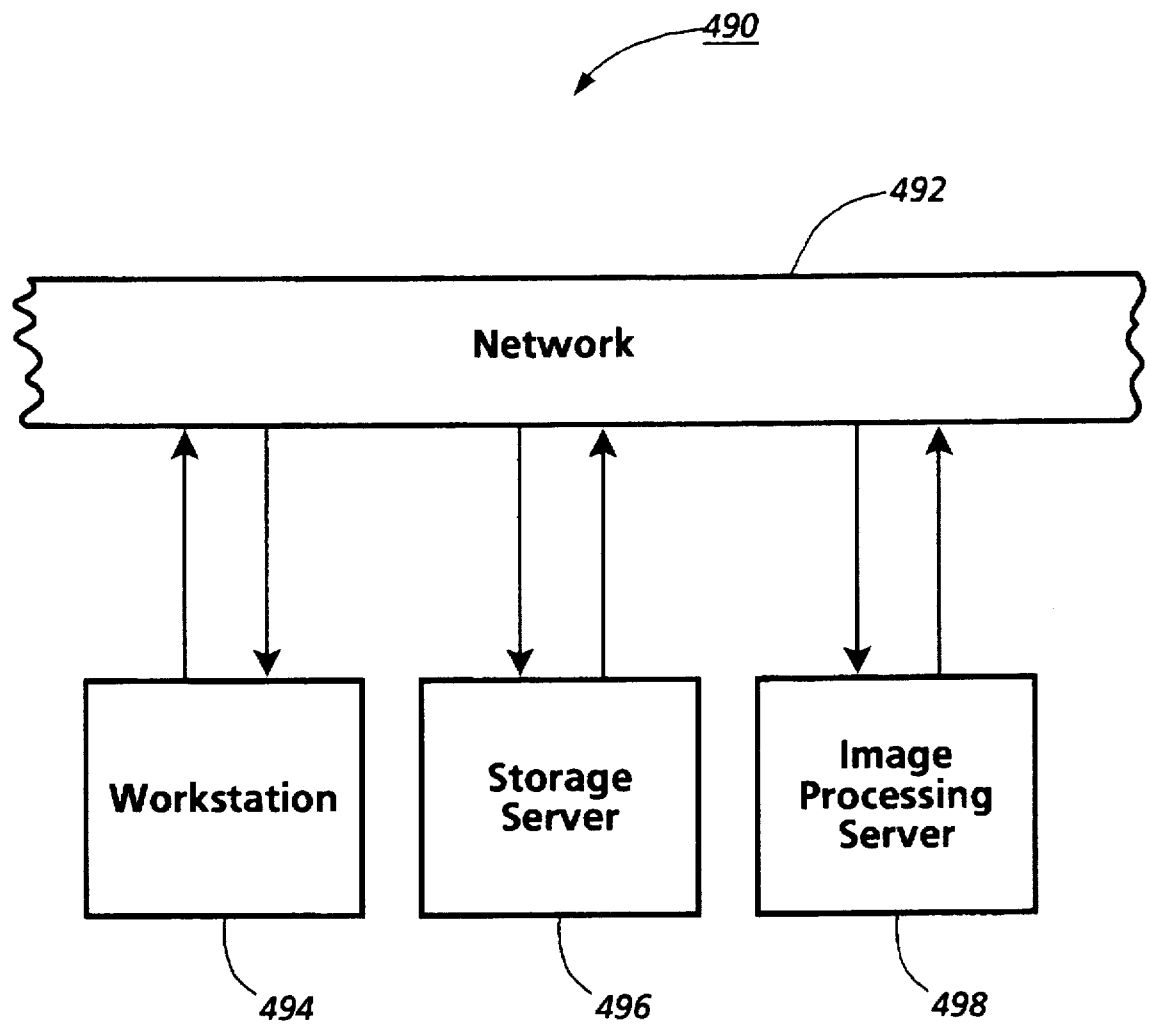
FIG. 16 is a schematic block diagram of an implementation with an image processing server.

The implementation described above in relation to FIG. 7 employs a workstation CPU that executes image processing instructions. FIG. 16 shows an alternative implementation that uses an image processing server. This implementation can provide the usual advantages of server architectures, including economy, speed, and sharing of resources.

System 490 in FIG. 16 includes network 492, workstation 494, storage server 496, and image processing server 498. A user can operate workstation 494 to provide requests on network 492 for storage of data defining images, such as from a scanner or other source. In response, storage server 496 can store the data. Then, the user can operate workstation 494 to provide requests for image processing operations like those described above. In response, image processing server 388 can perform the requested operations, executing instructions like those described above in relation to FIG. 7.

D. Application

Figure 17:
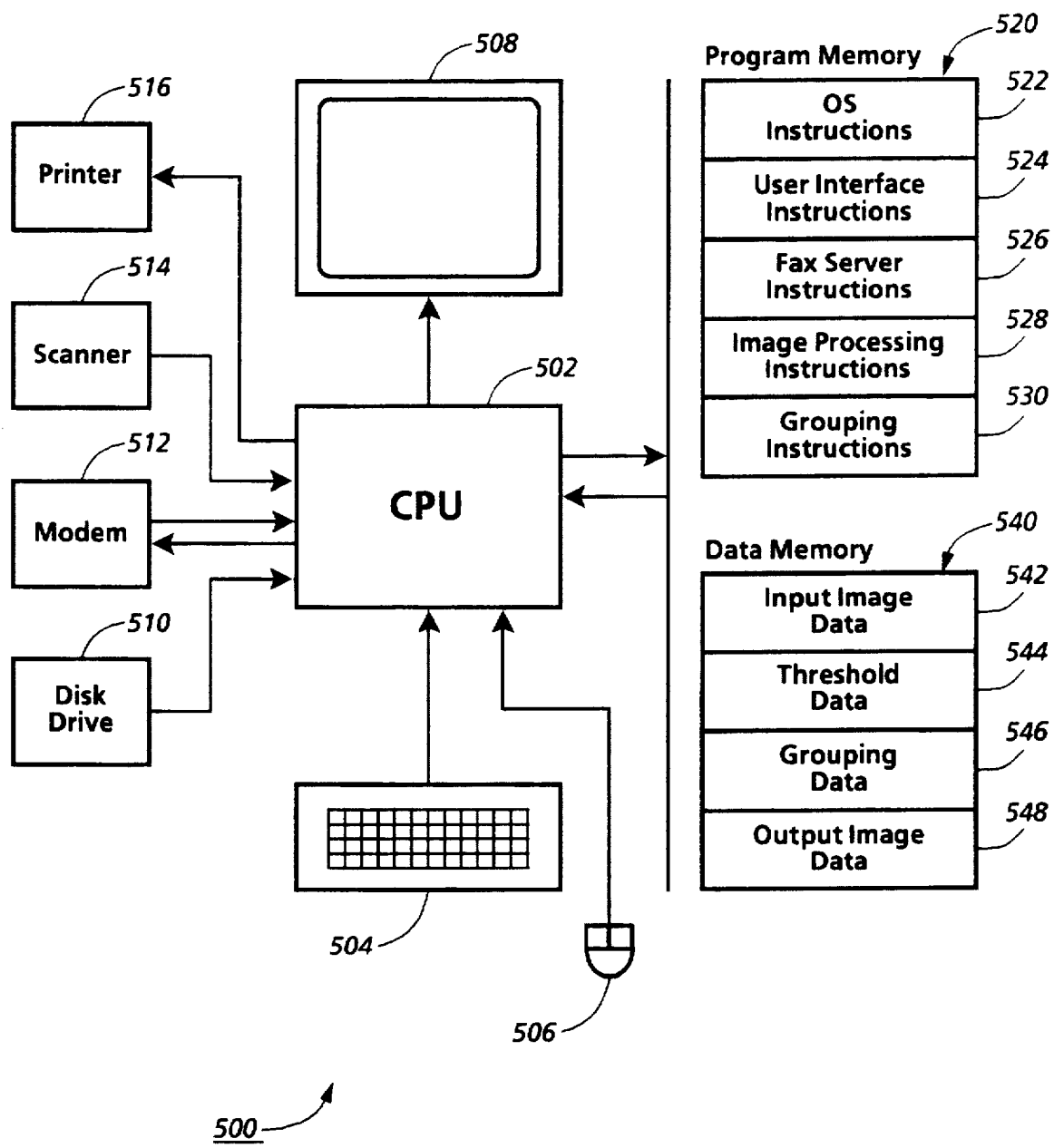
FIG. 17 is a schematic block diagram of a fax server application.
Figure 18:
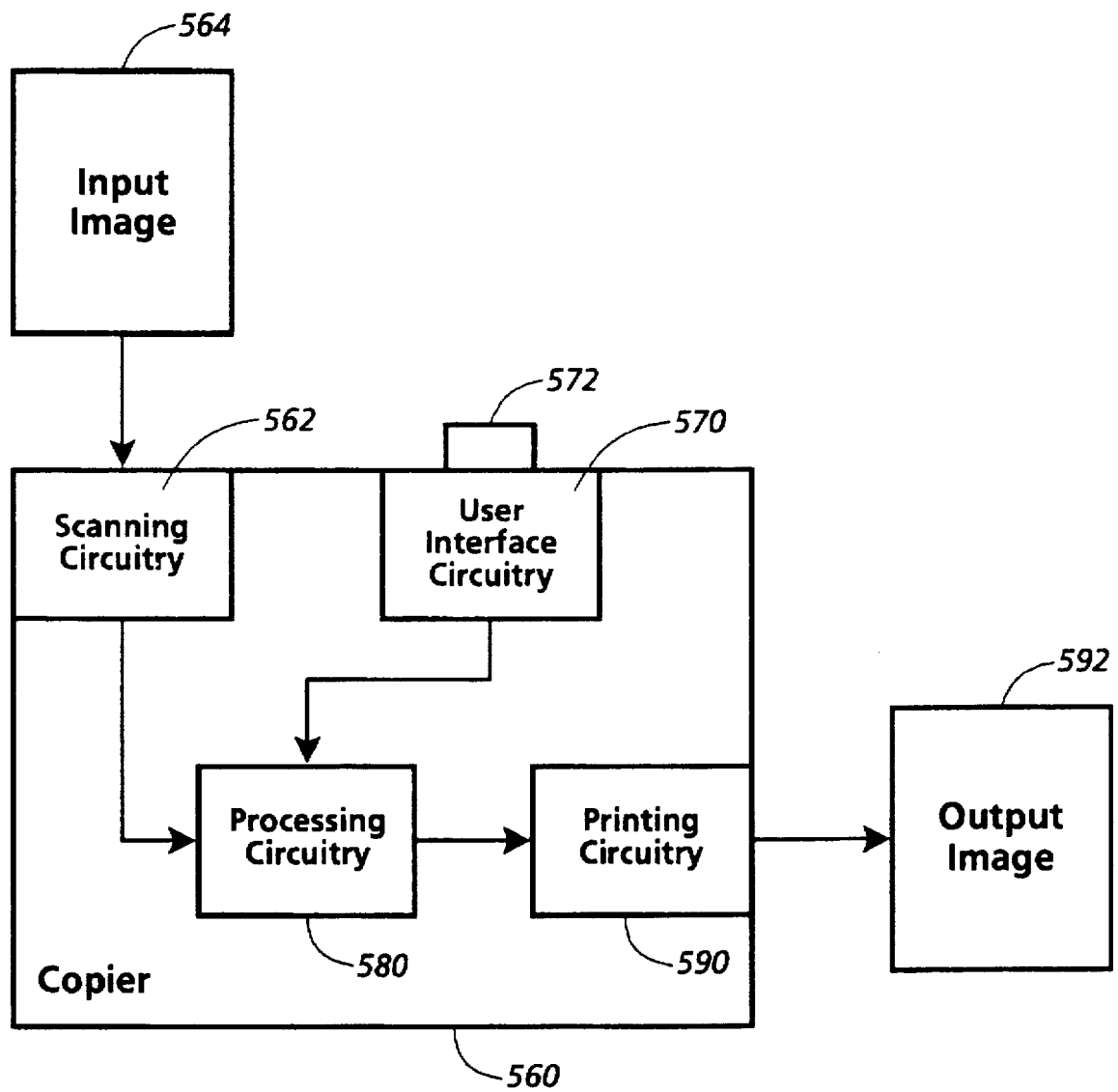
FIG. 18 is a schematic block diagram of a copier application.

The invention could be applied in many ways. FIG. 17 shows how the techniques described above could be applied in a personal computer that can operate as a fax server. FIG. 18 illustrates how the techniques described above could be applied in a copier.

System 500 in FIG. 17 includes CPU 502, which can be the CPU of a personal computer such as an IBM PC compatible machine. CPU 502 is connected to receive user input signals from keyboard 504 and mouse 506, and can present images to a user through display 508. CPU 502 is also connected to a number of other peripheral devices, illustratively including disk drive 510, modem 512, scanner 514, and printer 516.

Program memory 520 stores operating system (OS) instructions 522, which can be a version of DOS; user interface instructions 524; fax server instructions 526; image processing instructions 528; and grouping instructions 530. Fax server instructions 526 can be similar to the PaperWorks™ software product described in copending, coassigned U.S. patent application Ser. No. 08/096,198, entitled "Data Access Based on Human-Produced Images," incorporated herein by reference. Image processing instructions 528 can be implemented as described above in relation to image processing instructions 204 in FIG. 7. Grouping instructions 530 can be implemented as described above in relation to grouping instructions 206 in FIG. 7 and in relation to FIGS. 8–11. Fax server instructions 526, image processing instructions 528, and grouping instructions 530 could be obtained in the form of a software product stored on a floppy disk, diskette, or CD-ROM, and accessed for storage in program memory 520 by disk drive 510.

Data memory 540 stores input image data 542, threshold data 544, and grouping data 546 as described above in relation to FIGS. 7–11. Data memory 540 can also store output image data 548 if image processing instructions 528 obtain data defining an output image as described in copending, coassigned U.S. patent application Ser. Nos. 08/157,804, entitled "Analyzing an Image Showing Editing Marks to Obtain Category of Editing Operation"; U.S. Ser. No. 08/158,062 entitled "Analyzing an Image Showing a Parallel Length Graph"; and U.S. Ser. No. 08/157,856, entitled "Analyzing an Image Showing a Proportioned Parts Graph," all incorporated herein by reference.

System 500 can obtain input image data 542 defining an image in many ways: Data defining an image could be produced interactively, such as by executing user interface instructions 524. Any appropriate user interface techniques could be used, including pen-based techniques. Data defining a previously produced image could be retrieved from a storage medium by disk drive 510. Data defining an image could be obtained from scanner 514. A user could produce data defining an image elsewhere and provide it to system 500 through modem 512, such as by making a facsimile transmission to modem 512.

CPU 502 could execute fax server instructions 526 in response to a request received by facsimile transmission through modem 512. The request could include a form indicating an image analysis operation and also indicating an output image destination such as a fax machine or printer 516. The request could also include data defining an image or could indicate an image previously obtained by system 500.

Fax server instructions 526 could include calls to image processing instructions 528 to perform image analysis, and image analysis instructions 528 could in turn call grouping instructions 530 to perform acts like those shown in FIGS. 8–11 if a grouping operation is appropriate. Execution of fax server instructions 526 could further provide data defining an output image, which could be provided to modem 512 for facsimile transmission or to printer 516 for printing.

The implementations described above are especially well suited to offline image analysis as in FIG. 17 because speed of analysis matters less for offline analysis than it would for online analysis. Also, reliability may matter more for offline analysis than it would for online analysis. As illustrated in FIG. 18, however, the implementations described above may also be applied in online analysis, such as in a copier.

In FIG. 18, copier 560 can be a digital copier or other electronic reprographics system. Scanning circuitry 562 obtains data defining input image 564. User interface circuitry 570 includes touch sensing device 572, which can be a push button, a heat or pressure sensitive element, a capacitance sensing element, or other device for sensing a touching action. When a user touches device 572, user interface circuitry 570 provides touch data indicating that device 572 has been touched.

Processing circuitry 580 uses the touch data to obtain request data indicating a request for an image analysis operation. Then, responding to the request, processing circuitry 580 uses data defining input image 564 to automatically obtain grouping data indicating groups of connected components or groups of values of a parameter in input image 564 or in a data image obtained using input image 564. Processing circuitry 580 then uses the grouping data to obtain data defining an output image. This data is provided to printing circuitry 590 for printing of output image 592.

The invention could also be applied in combination with other techniques, including those described in coassigned U.S. patent application Ser. Nos. 08/158,132, now issued as U.S. Pat. No. 5,455,898, entitled "Analyzing an Image Showing a Graphical Representation of a Layout" and U.S. Ser. No. 08/158,063 entitled "Using a Category to Analyze an Image Showing a Graphical Representation," both incorporated herein by reference.

E. Miscellaneous

The invention has been described in relation to applications in which grouping data are used to obtain data defining an output image. The invention might also be implemented to store grouping data or to use grouping data for other purposes, such as to provide control signals.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a machine that includes:

image input circuitry for obtaining data defining images as input;

memory for storing data; and a processor connected for receiving data defining images from the image input circuitry and for accessing the memory;

the method comprising:

operating the processor to receive input image data from the image input circuitry, the input image data defining an input image;

operating the processor to use the input image data to obtain initial array data; the initial array data defining an initial array of value items, each value item indicating a value;

storing the initial array data in the memory;

operating the processor to access the initial array data in the memory and to use the initial array data to obtain gap data indicating one or more gaps between value items in the initial array;

operating the processor to use the gap data to obtain threshold data indicating a threshold; each gap indicated by the gap data being above or below the threshold; the threshold data indicating a threshold that would produce a number of groups of the value items; the number of groups being stable across a range of thresholds; the range of thresholds meeting a criterion for largeness of a range; and operating the processor to use the threshold data to obtain grouping data indicating a grouping of the value items in the initial array.

2. The method of claim 1 in which the grouping data indicate groups of value items, each group meeting a transitive closure criterion subject to the threshold in the initial array.

3. The method of claim 1 in which the number of groups of the value items is one of a set of numbers of groups; the criterion for largeness of a range requiring that the range of thresholds be larger than a range of thresholds across which any other number of groups in the set is stable.

4. The method of claim 3 in which the numbers in the set of numbers of groups are all greater than a minimum number of groups.

5. The method of claim 4 in which the minimum number of groups is one.

6. The method of claim 4 in which the minimum number of groups is two.

7. The method of claim 1 in which the gap data indicate, for each value item in the initial array, a distance; the threshold data indicating a threshold gap value; the act of operating the processor to use the threshold data to obtain grouping data comprising:

comparing the threshold gap value with each distance indicated by the gap data.

8. The method of claim 1 in which the initial array includes a set of value items that indicate values that meet a reference criterion; the gap data indicating, for each value item in the initial array, a distance to another value item that is in the set of value items that meet the reference criterion.

9. The method of claim 8 in which the reference criterion requires a value item indicating a value that is ON.

10. The method of claim 8 in which the reference criterion requires a value item indicating a value that is OFF.

11. The method of claim 1 in which the act of operating the processor to use the threshold data to obtain grouping data comprises:

obtaining thresholded data that indicate a set of the value items in the initial array; each value item in the set having a distance to another value item that meets a reference criterion; the distances of all the value items in the set meeting a comparison criterion in relation to the threshold; the set of value items including two or more subsets of value items, each subset meeting a transitive closure criterion subject to the threshold in the initial array; and using the thresholded data to obtain the grouping data by obtaining, for each subset of value items, a group identifier.

12. The method of claim 11 in which the thresholded data include a binary value for each value item in the initial array, the comparison criterion requiring a value item's distance to be above the threshold; each value item's binary value being ON if the value item's distance is above the threshold.

13. The method of claim 11 in which the thresholded data include a binary value for each value item in the initial array, the comparison criterion requiring a value item's distance to be below the threshold; each value item's binary value being ON if the value item's distance is below the threshold.

14. The method of claim 11 in which the thresholded data include a binary value for each value item in the initial array, each value item's binary value indicating whether the value item's distance meets the comparison criterion; the transitive closure criterion requiring a subset of value items to be a connected component.

15. The method of claim 11 in which the initial array data define an image that includes pixels, each value item in the initial array being a pixel value; the grouping data defining a version of the image indicating, for each value item that is in a group of value items defined by the thresholded data, the group's identifier.

16. The method of claim 15 in which the value items in the initial array define connected components; the grouping data defining groups that cluster the connected components.

17. The method of claim 16 in which the grouping data define groups that segment the image.

18. The method of claim 1 in which values of a parameter define the initial array; the method further comprising, before the act of storing initial array data:

operating the processor to obtain parameter data indicating a set of values of the parameter; and operating the processor to use the parameter data to obtain the initial array data; each value item in the initial array indicating, for one of the values of the parameter, whether its value is in the set of values indicated by the parameter data;

the act of operating the processor to use the initial array data to obtain gap data comprising:

using the initial array data to obtain difference data indicating a difference between adjacent values of the parameter for which value items in the initial array indicate that their values are in the set of values indicated by the parameter data; and using the difference data to obtain the gap data.

19. The method of claim 18 in which the act of operating the processor to use the threshold data to obtain grouping data comprises:

using the initial array data and the threshold data to obtain, for each value item in the initial array that indicates that its value is in the set of values, a group identifier that identifies a group that includes the value item; and using the group identifiers to obtain the grouping data.

20. The method of claim 19 in which the parameter data indicate, for each position in a parameter array, a value of the parameter; the parameter data indicating values that are in the set of values for a set of the positions; the act of using the group identifiers to obtain the grouping data comprising:

for each position in the set of positions, using the value indicated for the position by the parameter data and the group identifiers to obtain a group identifier for the position; the grouping data indicating a group identifier for each position in the set of positions.

21. The method of claim 20 in which the parameter data define an image; the grouping data defining a version of the image indicating, for each position, a group identifier.

22. The method of claim 20 in which the parameter is an attribute of features in images, each value of the parameter indicating a value of the attribute.

23. The method of claim 22 in which the attribute is area, elongation, aspect ratio, width, horizontal center of area, vertical center of area, or orientation.

24. The method of claim 1 in which the gap data indicate a gap for each value item in the initial array; the act of operating the processor to use the gap data to obtain threshold data comprising:

performing a sequence of iterations, the iterations including a first iteration and a number of following iterations, each following iteration having a preceding iteration, each iteration having threshold candidate data indicating a candidate threshold, the threshold candidate data of each following iteration indicating a candidate threshold that is greater than the preceding iteration's candidate threshold; each iteration comprising:

using the iteration's threshold candidate data to obtain thresholded data, the thresholded data indicating, for each value item in the initial array, whether the gap indicated by the gap data for the value item is above or below the iteration's candidate threshold; the thresholded data defining a number of groups of the value items in the initial array; and using the iteration's thresholded data to obtain group count data indicating the number of groups defined by the thresholded data.

25. The method of claim 24 in which the act of operating the processor to use the gap data to obtain threshold data further comprises:

using the iterations' group count data to obtain subsequence length data indicating a number of iterations in each subsequence of iterations with group count data indicating equal numbers of groups; and using the subsequence length data to obtain the threshold data; the threshold data indicating the candidate threshold of an iteration with group count data indicating a first number of groups; the subsequence length data indicating that a subsequence of iterations with group count data indicating the first number of groups includes a range of thresholds that meets the criterion for largeness of a range.

26. The method of claim 24 in which each following iteration further comprises:

using the preceding iteration's threshold data to obtain the following iteration's threshold data, the following iteration's threshold data indicating a threshold that is greater than the preceding iteration's threshold by a gap difference, the gap difference being a difference between gaps indicated by the gap data between which no indicated gaps occur;

the act of operating the processor to use the gap data to obtain threshold data further comprising:

using the iterations' group count data to obtain threshold range data indicating a range of thresholds in each subsequence of iterations with group count data indicating equal numbers of groups; and using the threshold range data to obtain the threshold data; the threshold data indicating the candidate threshold of an iteration with group count data indicating a first number of groups; the threshold range data indicating that a subsequence of iterations with group count data indicating the first number of groups includes a range of thresholds that meets the criterion for largeness of a range.

27. The method of claim 1 in which the gap data indicate a gap for each value item in the initial array; the act of operating the processor to use the gap data to obtain threshold data comprising:

using the gap data to obtain largest difference data, the largest difference data indicating, for the gaps indicated by the gap data, a largest difference between gaps between which no indicated gaps occur; the largest difference occurring between a lower gap and an upper gap; and using the largest difference data to obtain the threshold data, the threshold data indicating a threshold that is above the lower gap and below the upper gap;

the act of operating the processor to use the threshold data to obtain grouping data comprising:

using the initial array data to obtain distance data indicating a distance for each value item in the initial array; and using the threshold data and the distance data to compare the threshold to each value item's distance.

28. The method of claim 27 in which the gap data indicate, for value items in the initial array that meet a foreground neighbor border criterion, a distance to a near neighbor in the initial array; the distance data indicating a distance to a near neighbor for each value item in the initial array; the act of operating the processor to use the threshold data to obtain grouping data further comprising:

grouping value items together that have distances that are below the threshold.

29. The method of claim 27 in which the gap data indicate, for value items in the initial array that meet an opposing foreground neighbor border criterion, a distance to a near neighbor in the initial array; the distance data indicating a distance to a near neighbor for each value item in the initial array; the act of operating the processor to use the threshold data to obtain grouping data further comprising:

grouping value items together that have distances that are above the threshold.

30. The method of claim 27 in which the gap data indicate, for value items in the initial array that meet an opposing background neighbor border criterion, a distance to a near neighbor in the complement of the initial array; the distance data indicating a distance to a near neighbor in the complement of the initial array for each value item in the initial array; the act of operating the processor to use the threshold data to obtain grouping data further comprising:

grouping value items together that have distances that are above the threshold.

31. A machine comprising:

memory for storing data; and a processor connected for accessing data stored in the memory;

the data stored in the memory comprising initial array data defining an initial array of value items, each value item indicating a value;

the data stored in the memory further comprising instruction data indicating grouping instructions the processor can execute; the processor, in executing the grouping instructions:

accessing the initial array data in the memory and using the initial array data to obtain gap data indicating one or more gaps between value items in the initial array;

using the gap data to obtain threshold data indicating a threshold; each gap indicated by the gap data being above or below the threshold; the threshold data indicating a threshold that would produce a number of groups of the value items; the number of groups being stable across a range of thresholds; the range of thresholds meeting a criterion for largeness of a range; and using the threshold data to obtain grouping data indicating a grouping of the value items in the initial array.

32. The machine of claim 31 in which the machine further comprises input image circuitry for obtaining data defining images as input; the instruction data further indicating image processing instructions the processor can execute; the processor further, in executing the image processing instructions:

receiving input image data from the image input circuitry, the input image data defining an input image; and using the input image data to obtain the initial array data and providing the initial array data to the memory.

33. The machine of claim 32 in which the input image circuitry is connected for receiving facsimile transmissions.

34. The machine of claim 31 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the grouping instructions.

35. The machine of claim 31 in which the machine is a fax server.

36. The machine of claim 31 in which the machine is a copier.

37. An article of manufacture for use in a machine that includes:

a storage medium access device for accessing a medium that stores data;

memory for storing data; the data stored in the memory comprising initial array data defining an initial array of value items, each value item indicating a value; and a processor connected for receiving data from the storage medium access device and also connected for accessing data in the memory;

the article comprising:

a storage medium that can be accessed by the storage medium access device when the article is used in the machine; and data stored by the storage medium so that the storage medium access device can provide the stored data to the processor when the article is used in the machine; the stored data comprising instruction data indicating instructions the processor can execute; the processor, in executing the instructions:

accessing the initial array data in the memory and using the initial array data to obtain gap data indicating one or more gaps between value items in the initial array;

using the gap data to obtain threshold data indicating a threshold; each gap indicated by the gap data being above or below the threshold; the threshold data indicating a threshold that would produce a number of groups of the value items; the number of groups being stable across a range of thresholds; the range of thresholds meeting a criterion for largeness of a range; and using the threshold data to obtain grouping data indicating a grouping of the value items in the initial array.

38. A method of performing image processing by operating a machine; the machine including:

image input circuitry for obtaining data defining images as input; and a processor connected for receiving data defining images from the image input circuitry;

the method comprising:

operating the processor to receive input image data from the image input circuitry, the input image data defining an input image; the input image including pixels and features, each feature including a set of the pixels;

operating the processor to use the input image data to obtain parameter image data; the parameter image data indicating, for each pixel in the input image, a value for a parameter that is an attribute of features in the input image;

operating the processor to use the parameter image data to obtain threshold data and one-dimensional array data; the one-dimensional array data defining a one-dimensional array of value items, each value item indicating, for a value of the parameter, whether at least one of the pixels in the input image has the value; the threshold data indicating a threshold that would produce a number of groups of the value items; the number of groups being stable across a range of thresholds; the range of thresholds meeting a criterion for largeness of a range;the act of using the parameter image data comprising:

using the parameter image data to obtain gap data indicating one or more gaps between values of the parameter that occur in the parameter image data; and using the gap data to obtain the threshold data; each gap indicated by the gap data being above or below the threshold indicated by the threshold data;

operating the processor to perform a series of iterations, each iteration handling a value item in the one-dimensional array; for each iteration after a first iteration in the series, the value item handled by the iteration being advanced by one from the item handled by an immediately preceding iteration; each iteration:

obtaining a distance count for the value item handled by the iteration; each value item's distance count indicating a distance within the one-dimensional array to a value item indicating that at least one of the pixels in the input image has the item's value; and if the value item handled by the iteration indicates that at least one of the pixels in the input image has the item's value, obtaining a group identifier for the value item; the act of obtaining a group identifier comprising:

if the distance count of the immediately preceding value item is above the threshold, obtaining a new group identifier for the value item; and if the distance count of the immediately preceding value item is below the threshold, obtaining a group identifier for the value item that is the same as a most recently obtained group identifier; and operating the processor to use the group identifiers of the value items to obtain grouped parameter image data; the grouped parameter image data including, for each pixel for which the parameter image data indicates a non-zero value, the group identifier for the value item in the one-dimensional array for the pixel's value.

39. A method of performing image processing by operating a machine; the machine including:

image input circuitry for obtaining data defining images as input; and a processor connected for receiving data defining images from the image input circuitry;

the method comprising:

operating the processor to receive input image data from the image input circuitry, the input image data defining an input image; the input image including pixels and features, each feature including a set of the pixels;

operating the processor to use the input image data to obtain parameter image data; the parameter image data indicating, for each pixel in the input image, a value for a parameter that is an attribute of features in the input image;

operating the processor to use the parameter image data to obtain threshold data and distance image data; the distance image data indicating, for each pixel in the input image, a distance to a near neighbor; the threshold data indicating a threshold that would produce a number of groups of the features; the number of groups being stable across a range of thresholds; the range of thresholds meeting a criterion for largeness of a range; the act of using the parameter image data comprising:

using the parameter image data to obtain distance data indicating one or more distances between pixels in the input image; and using the distance data to obtain the threshold data; each distance indicated by the distance data being above or below the threshold indicated by the threshold data;

operating the processor to use the threshold data and the distance image data to obtain groups image data indicating, for each pixel, whether it is above or below the threshold; the act of operating the processor to use the threshold data and the distance image data comprising:

comparing the threshold indicated by the threshold data with each pixel's value indicated by the distance image data.

* * * * *